(12) United States Patent
Xiao et al.

(10) Patent No.: US 11,635,678 B2
(45) Date of Patent: Apr. 25, 2023

(54) FRESNEL PROJECTION SCREEN AND PROJECTION SYSTEM

(71) Applicant: HISENSE LASER DISPLAY CO., LTD., Shandong (CN)

(72) Inventors: Wei Xiao, Shandong (CN); Chao Wang, Shandong (CN); Fei Zhao, Shandong (CN); Qiang Zhong, Shandong (CN); Xiaoping Li, Shandong (CN)

(73) Assignee: HISENSE LASER DISPLAY CO., LTD., Shandong (CN)

( * ) Notice: Subject to any disclaimer, the term of this patent is extended or adjusted under 35 U.S.C. 154(b) by 0 days.

(21) Appl. No.: 17/551,812

(22) Filed: Dec. 15, 2021

(65) Prior Publication Data

US 2022/0113616 A1    Apr. 14, 2022

Related U.S. Application Data

(63) Continuation of application No. 17/036,685, filed on Sep. 29, 2020, now Pat. No. 11,231,644, which is a
(Continued)

(30) Foreign Application Priority Data

Apr. 16, 2018  (CN) .......................... 201810338500.4
Apr. 16, 2018  (CN) .......................... 201810339425.3
(Continued)

(51) Int. Cl.
*G03B 21/60* (2014.01)
*G03B 21/602* (2014.01)

(52) U.S. Cl.
CPC .......... *G03B 21/60* (2013.01); *G03B 21/602* (2013.01)

(58) Field of Classification Search
CPC ..... G03B 21/60; G03B 21/602; G02B 17/006
See application file for complete search history.

(56) References Cited

U.S. PATENT DOCUMENTS

| 3,893,748 A | 7/1975 | De Palma |
| 4,911,529 A | 3/1990 | Van De Ven |

(Continued)

FOREIGN PATENT DOCUMENTS

| CN | 1493891 A | 5/2004 |
| CN | 1601347 A | 3/2005 |

(Continued)

OTHER PUBLICATIONS

International Search Report and Written Opinion of the International Searching Authority issued in corresponding International Application No. PCT/CN2019/075617 dated May 17, 2019, with English translation.
(Continued)

*Primary Examiner* — Christopher E Mahoney
(74) *Attorney, Agent, or Firm* — Morgan, Lewis & Bockius LLP

(57) ABSTRACT

A Fresnel projection screen includes: a Fresnel layer; a first micro-structure layer disposed at a light incident side of the Fresnel layer, the first micro-structure layer including a plurality of micro-structures that are configured to diffusely reflect a portion of light incident thereon and refract another portion of the light; a second micro-structure layer disposed on a surface of the first micro-structure layer, the second micro-structure layer including a plurality of second microstructures that are configured to diffusely reflect a portion of light incident thereon and refract another portion of the light; and a reflective layer disposed on a side of the Fresnel layer away from the first micro-structure layer.

20 Claims, 24 Drawing Sheets

Related U.S. Application Data continuation-in-part of application No. PCT/CN2019/075617, filed on Feb. 20, 2019.

(30) Foreign Application Priority Data

| | | |
|---|---|---|
| Apr. 27, 2018 | (CN) | 201810393661.3 |
| May 10, 2018 | (CN) | 201810444670.0 |

(56) References Cited

U.S. PATENT DOCUMENTS

| | | | |
|---|---|---|---|
| 6,130,777 | A | 10/2000 | Yamashita |
| 6,636,363 | B2 * | 10/2003 | Kaminsky ............ G02B 5/0221 349/95 |
| 6,798,574 | B2 | 9/2004 | Kim |
| 2004/0160669 | A1 | 8/2004 | Osawa et al. |
| 2005/0068620 | A1 | 3/2005 | Umeya |
| 2005/0248843 | A1 * | 11/2005 | Maruta ................ G03B 21/602 359/459 |
| 2006/0001966 | A1 | 1/2006 | Ohishi et al. |
| 2008/0043326 | A1 * | 2/2008 | Poulsen ................ G03B 21/60 359/455 |
| 2015/0286125 | A1 | 10/2015 | Powell |
| 2015/0362832 | A1 | 12/2015 | Chuang et al. |
| 2017/0242329 | A1 | 8/2017 | Chien |
| 2019/0354002 | A1 | 11/2019 | Hu |

FOREIGN PATENT DOCUMENTS

| | | |
|---|---|---|
| CN | 1716086 A | 1/2006 |
| CN | 203444128 U | 2/2014 |
| CN | 203673213 U | 6/2014 |
| CN | 104460213 A | 3/2015 |
| CN | 105204282 A | 12/2015 |
| CN | 106707529 A | 5/2017 |
| CN | 206148474 U | 5/2017 |
| CN | 107561847 A | 1/2018 |
| CN | 107728419 A | 2/2018 |
| CN | 206975396 U | 2/2018 |
| JP | 2004-272235 A | 9/2004 |
| JP | 2007-171561 A | 7/2007 |
| JP | 2010-204226 A | 9/2010 |
| JP | 2011-28080 A | 2/2011 |
| JP | 2014-71344 A | 4/2014 |
| JP | 2014-182168 A | 9/2014 |
| JP | 2015-68943 A | 4/2015 |

OTHER PUBLICATIONS

First Office Action issued in corresponding Chinese Patent Application No. 201810444670.0 dated Apr. 3, 2020, with English translation.
Second Office Action issued in corresponding Chinese Patent Application No. 201810444670.0 dated Aug. 28, 2020, with English translation.
First Office Action issued in corresponding Chinese Patent Application No. 201810338500.4 dated Feb. 25, 2020, with English translation.
Second Office Action issued in corresponding Chinese Patent Application No. 201810338500.4 dated Sep. 18, 2020, with English translation.
First Office Action issued in corresponding Chinese Patent Application No. 201810339425.3 dated Feb. 25, 2020, with English translation.
Second Office Action issued in corresponding Chinese Patent Application No. 201810339425.3 dated Sep. 16, 2020, with English translation.
First Office Action issued in corresponding Chinese Patent Application No. 201810393661.3 dated Feb. 25, 2020, with English translation.
Second Office Action issued in corresponding Chinese Patent Application No. 201810393661.3 dated Jun. 19, 2020, with English translation.
Third Office Action issued in corresponding Chinese Patent Application No. 201810393661.3 dated Sep. 24, 2020, with English translation.
Chinese Decision of Rejection dated Jun. 17, 2021 issued in Chinese Patent Application No. 201810339425.3 (with English translation).
Chinese Decision of Rejection dated Jan. 13, 2021 issued in Chinese Patent Application No. 201810444670.0 (with English translation).
Chinese Third Office Action dated Jan. 29, 2021 issued in Chinese Patent Application No. 201810339425.3 (with English translation).
U.S. Notice of Allowance dated Sep. 15, 2021 issued in U.S. Appl. No. 17/036,685.
U.S. Non-Final Office Action dated May 27, 2021 issued in U.S. Appl. No. 17/036,685.

* cited by examiner

FRESNEL PROJECTION SCREEN AND PROJECTION SYSTEM

CROSS-REFERENCE TO RELATED APPLICATIONS

This application is a Continuation Application of U.S. patent application Ser. No. 17/036,685 filed Sep. 29, 2020, which is a Bypass Continuation-in-Part Application of PCT/CN2019/075617 filed Feb. 20, 2019, which claims priority to Chinese Patent Application No. 201810338500.4 filed Apr. 16, 2018, Chinese Patent Application No. 201810339425.3 filed Apr. 16, 2018, Chinese Patent Application No. 201810393661.3 filed Apr. 27, 2018, and Chinese Patent Application No. 201810444670.0 filed May 10, 2018, which are incorporated herein by reference in their entirety.

TECHNICAL FIELD

Some embodiments of the present disclosure relates to a Fresnel projection screen and a projection system.

BACKGROUND

In the field of projection display technologies, especially in the field of ultra-short focus laser projection display technologies, a projector is generally used with a Fresnel projection screen. The screen has characteristics of high gain and small viewing angle, which may improve brightness to a maximum extent when the screen is viewed directly by human eyes. The screen has a certain resistance to ambient light, and has a good display effect.

SUMMARY

In a first aspect, some embodiments of the present disclosure provide a Fresnel projection screen. The Fresnel projection screen includes a Fresnel layer, a first micro-structure layer, a second micro-structure layer and a reflective layer. The first micro-structure layer is disposed at a light incident side of the Fresnel layer. The first micro-structure layer includes a plurality of micro-structures that are configured to diffusely reflect a portion of light incident thereon and refract another portion of the light. The second micro-structure layer is disposed on a surface of the first micro-structure layer, and the second micro-structure layer includes a plurality of second micro-structures that are configured to diffusely reflect a portion of light incident thereon and refract another portion of the light. The reflective layer is disposed on a side of the Fresnel layer away from the first micro-structure layer.

In a second aspect, some embodiments of the present disclosure provide a projection system. The projection system includes a projector and the Fresnel projection screen described above. The projector is configured to project light onto the Fresnel projection screen. The Fresnel projection screen is configured to receive the light projected by the projector and to display a corresponding image.

In a third aspect, some embodiments of the present disclosure provide a Fresnel projection screen. The Fresnel projection screen includes a transparent layer, a color layer, a diffusion layer and a Fresnel layer arranged in sequence along a light incident direction. The transparent layer includes a transparent base and a micro-structure layer. The micro-structure layer is disposed on a light incident surface of the transparent base. The micro-structure layer is configured to diffusely reflect a portion of light incident thereon and refract another portion of the light. The micro-structure layer includes a plurality of first micro-structures and a plurality of second micro-structures disposed on a surface of the plurality of first micro-structures. A dimension of each first micro-structure is greater than a dimension of each second micro-structure. The dimension includes at least one of a width, length or thickness of a micro-structure.

BRIEF DESCRIPTION OF THE DRAWINGS

In order to describe technical solutions in embodiments of the present disclosure more clearly, the accompanying drawings to be used in the description of the embodiments will be introduced briefly. However, the accompanying drawings to be described below are merely some embodiments of the present disclosure, and a person of ordinary skill in the art can obtain other drawings according to these drawings without paying any creative effort.

Figures 22, 23:
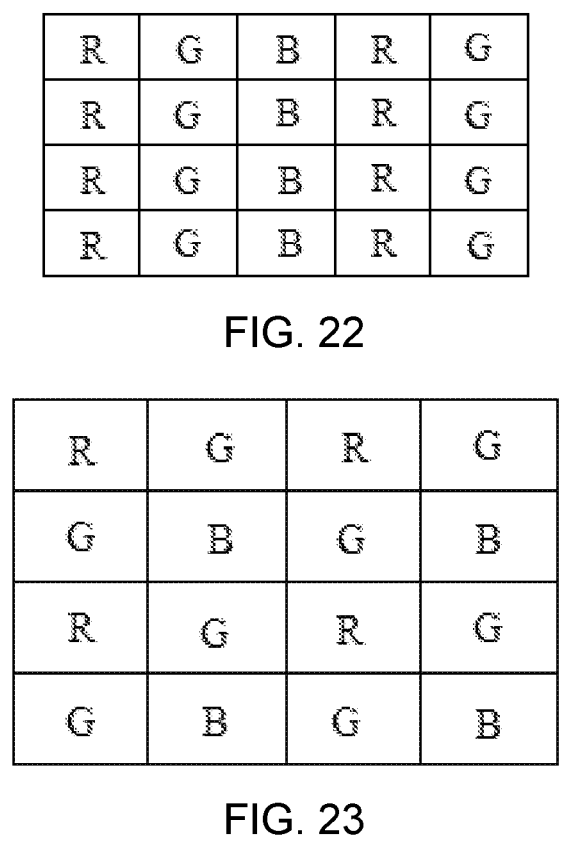

FIG. 22 shows a straight-bar arrangement of RGB;

FIG. 23 shows a four-pixel arrangement of RGB;

DETAILED DESCRIPTION

Figure 1:
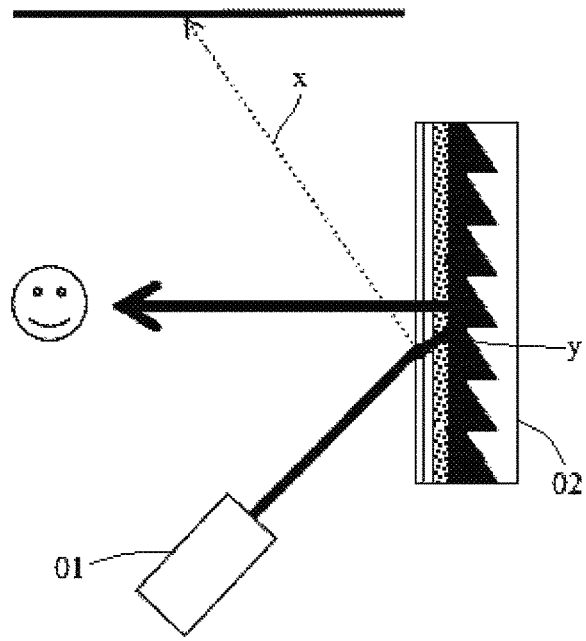
FIG. 1 is a diagram showing how a Fresnel projection screen reflects light.

The technical solutions in some embodiments of the present disclosure will be described clearly and completely below with reference to the accompanying drawings in some embodiments of the present disclosure. However, the described embodiments are merely some but not all embodiments of the present disclosure. All other embodiments made on the basis of some embodiments of the present disclosure by a person of ordinary skill in the art without paying any creative effort shall be included in the protection scope of the present disclosure.

It will be understood that, in the description of some embodiments of the present disclosure, orientations or positional relationships indicated by the terms "center", "upper", "lower", "front", "rear", "left", "right", "vertical", "horizontal", "top", "bottom", "inner", "outer", etc. are based on orientations or positional relationships shown in the drawings, merely to facilitate and simplify the description of the present disclosure, but not to indicate or imply that the referred devices or elements must have a particular orientation, or must be constructed or operated in a particular orientation. Therefore, these terms should not be construed as limitations to the present disclosure.

The terms such as "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of some embodiments of the present disclosure, the term "a plurality of" means two or more unless otherwise specified.

"Substantially" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "Substantially" or "approximately" can mean within one or more standard deviations, or within ±30%, 20%, 10% or 5% of the stated value.

"And/or" as used herein includes three situations: only A, only B, and A and B.

FIG. 1 is a diagram showing how a Fresnel projection screen reflects light. As shown in FIG. 1, when light emitted by a projector 01 enters the screen 02 from air, due to a difference between a refractive index of a material of the projection surface of the screen 02 and a refractive index of air, a portion of the light (i.e., the light beam x) is specularly reflected by the projection surface of the screen 02 to a region near the screen 02, such as a ceiling, and another portion of the light (i.e., the light beam y), which is refracted, enters the screen 02 for imaging.

Figure 2:
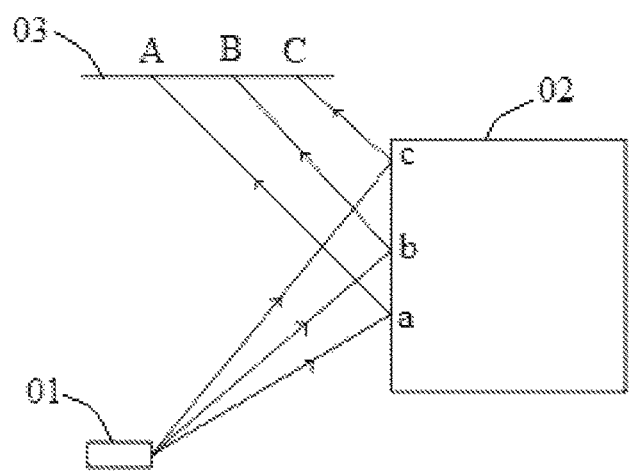
FIG. 2 is a diagram showing how a Fresnel projection screen reflects light to form images.

FIG. 2 is a diagram showing how a Fresnel projection screen reflects light to form images. As shown in FIG. 2, when the projector 01 projects a preset image with preset colors onto a projection surface of the Fresnel projection screen 02, a portion of light emitted by the projector 01 enters the screen 02 to form the preset image, and another portion of the light is specularly reflected by the projection surface of the screen 02 and travels to the ceiling 03. When colors at positions a, b and c on the projection surface of the screen 02 are different, colors at corresponding positions A, B and C on the ceiling 03 are also different. As a result, an image with low brightness and similar to the preset image is formed on the ceiling 03.

It will be noted that a light incident side of the Fresnel projection screen refers to a side thereof from which the light enters the Fresnel projection screen. A light incident side of a layer in the Fresnel projection screen herein refers to a side of the layer closer to the light incident side of the Fresnel projection screen than the opposite side of the layer. A light incident surface of a layer in the Fresnel projection screen herein refers to a surface of the layer closer to the light incident side of the Fresnel projection screen than the opposite surface of the layer.

Figure 6:
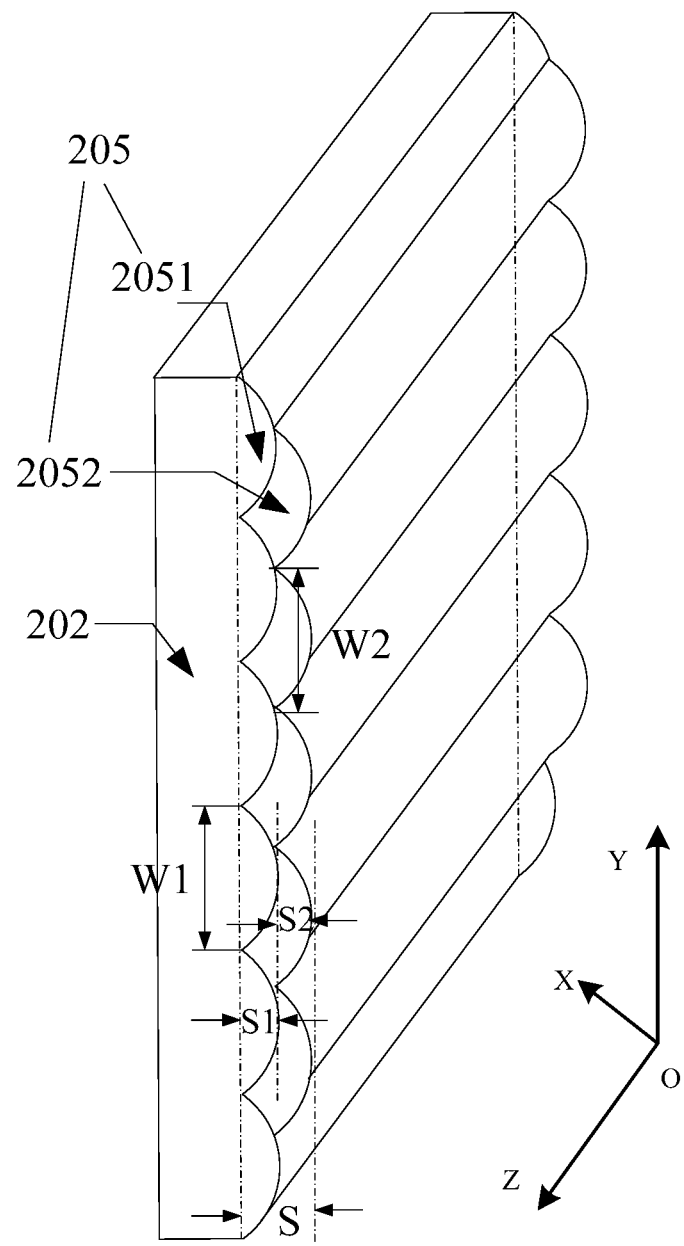
FIG. 6 is a perspective view of the micro-structure layer in the Fresnel projection screen shown in FIG. 5A.

As shown in FIG. 6, a vertical direction OY used herein may refer to a vertical direction when the Fresnel projection screen is placed vertically and is in use, such as the width direction of the Fresnel projection screen. A horizontal direction OZ may refer to a horizontal direction when the Fresnel projection screen is placed vertically and is in use, such as the length direction of the Fresnel projection screen. A thickness direction OX, the vertical direction OY and the horizontal direction OZ may perpendicular to each other. On this basis, the cross section used herein may be a section parallel to a plane defined by the vertical direction OY and the thickness direction OX. A cross section of a micro-structure is, for example, a cross section passing through the apex of the micro-structure.

FIGS. 3A to 4C are schematic diagrams of Fresnel projection screens according to some embodiments, and show micro-structures in the Fresnel projection screens.

As shown in FIGS. 3A to 4C, the Fresnel projection screen includes a Fresnel layer 203 and a transparent layer 100 disposed at a light incident side of the Fresnel layer 203.

Figure 3A:
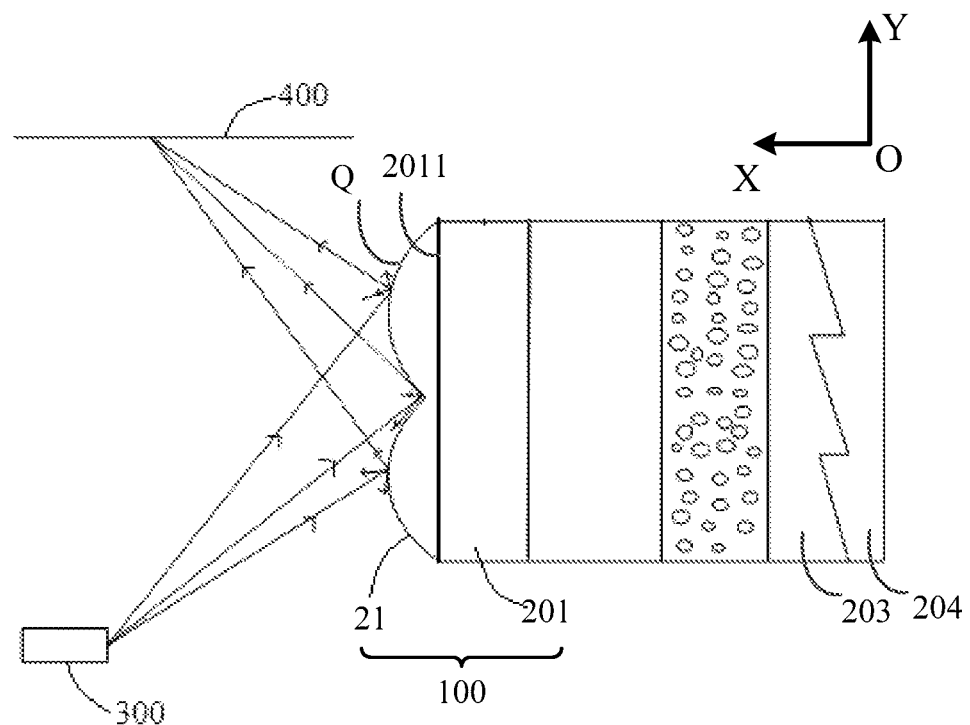
FIG. 3A is a schematic diagram of a Fresnel projection screen, in accordance with some embodiments.

As shown in FIG. 3A, the Fresnel layer 203 is, for example, a Fresnel lens, which has a plurality of microstructures, such as grooves, formed in a surface thereof facing away from the transparent layer 100.

The transparent layer 100 is, for example, transparent, and allows light to pass through. A refractive index of the transparent layer 100 may be within a range from approximately 1.3 to approximately 1.8, such as, 1.3, 1.4, 1.5, 1.6, 1.7 or 1.8. The transparent layer 100 may be made of transparent plastic. For example, the transparent layer 100 includes a transparent base 201 and the material of the transparent base 201 includes at least one of polycarbonate (PC), polyethylene terephthalate (PET), styrene-co-methyl methacrylate (MS), or polymethyl methacrylate (PMMA).

The transparent layer 100 includes, for example, the transparent base 201 and a micro-structure layer disposed on a light incident surface (also called a first surface 2011 hereinafter) of the transparent base 201. The micro-structure layer is configured such that a portion of light is refracted when entering the micro-structure layer through its light incident surface, and another portion of the light is diffusely reflected when incident on the light incident surface of the micro-structure layer. The refracted light enters the Fresnel layer 203 to form the preset image. Since the diffusely reflected light may not gather in a specific region, the reflected light may not form an image similar to the preset image near the screen.

Figure 3B:
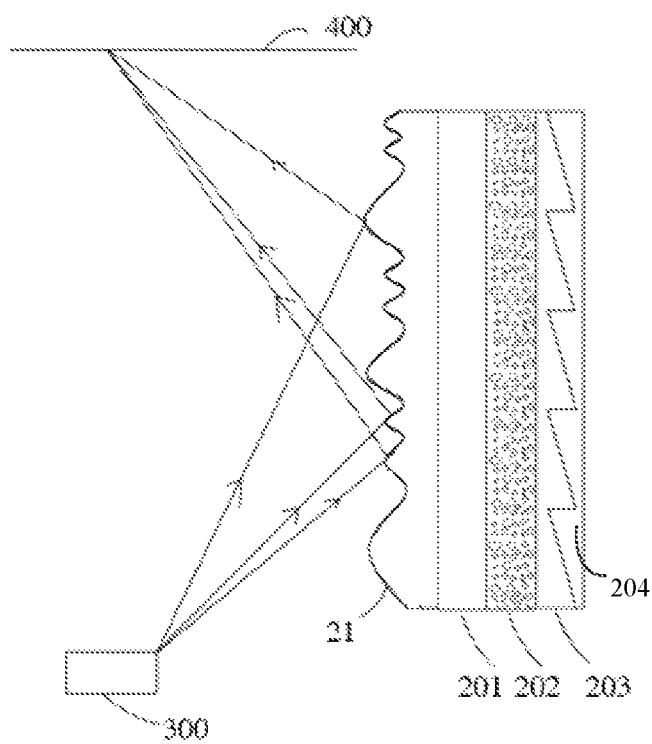
FIG. 3B is a schematic diagram of another Fresnel projection screen, in accordance with some embodiments.

In some embodiments, as shown in FIGS. 3A and 3B, the micro-structure layer includes a first micro-structure layer, and the first micro-structure layer includes a plurality of first micro-structures 21.

In some examples, as shown in FIG. 3A, a thickness of each first micro-structure 21 is the same. The thickness of the first micro-structure 21 may refer to a maximum distance between a surface of the first micro-structure 21 facing away from the transparent base 201 and the first surface 2011 of the transparent base 201 facing the first micro-structure 21 in the thickness direction of the Fresnel layer 203 (i.e., the thickness direction OX in FIG. 3A). If the first micro-structure 21 and the transparent base 201 are integrally formed, the thickness of the first micro-structure 21 may refer to a maximum distance between the surface of the first micro-structure 21 facing away from the transparent base 201 and a surface of the transparent base 201 facing away from the first micro-structure 21 in the thickness direction of the Fresnel layer 203 (i.e., the thickness direction OX in FIG. 3A).

In some other examples, the thicknesses of some of the plurality of first micro-structures 21 are the same. In some other examples, the thicknesses of two adjacent first micro-structures 21 are different. In some other examples, as shown in FIG. 3B, the thicknesses of the plurality of first micro-structures 21 are randomly set. Of course, the thicknesses of the first micro-structures 21 are not limited thereto, and may be set according actual needs. For example, the thicknesses of two adjacent first micro-structures 21 are the same, but are different from thicknesses of other first micro-structures 21.

In some examples, as shown in FIG. 3A, a width of each first micro-structure 21 is the same. The width of the first micro-structure 21 refers to a maximum dimension of an orthographic projection of the first micro-structure 21 on the transparent base 201 in the vertical direction OY.

In some other examples, the widths of some of the plurality of first micro-structures 21 are the same. In some other examples, the widths of two adjacent first micro-structures 21 are different. In some other examples, as shown in FIG. 3B, the widths of the plurality of first micro-structures 21 are randomly set. Of course, the widths of the first micro-structures 21 are not limited thereto, and may be set according actual needs. For example, the widths of two adjacent first micro-structures 21 are the same, but are different from widths of other first micro-structures 21.

In some examples, as shown in FIG. 3A, a length of each first micro-structure 21 is the same. The length of the first micro-structure 21 refers to a maximum dimension of the orthographic projection of the first micro-structure 21 on the transparent base 201 in the horizontal direction OZ.

In some other examples, the lengths of some of the plurality of first micro-structures 21 are the same. In some other examples, the lengths of two adjacent first micro-structures 21 are different. In some other examples, as shown in FIG. 3B, the lengths of the plurality of first micro-structures 21 are randomly set. Of course, the lengths of the first micro-structures 21 are not limited thereto, and may be set according actual needs. For example, the lengths of two adjacent first micro-structures 21 are the same, but are different from lengths of other first micro-structures 21.

In some examples, as shown in FIG. 3A, a segment Q of an outer border of the cross section of the first micro-structure 21 facing away from the transparent base 201 is one segment of an arc such as a circle, an ellipse, a parabola, a hyperbola or a free curve, and is smooth. In some examples, the first micro-structure 21 is a protrusion or a groove. The protrusion is, for example, an arc-shaped protrusion, a columnar protrusion, a prismatic protrusion, or a conical frustum shaped projection.

For example, the orthographic projection of the first micro-structure 21 on the transparent base 201 is in a shape of a circle, and the cross section of the first micro-structure 21 passing through its apex is in a shape of a semicircle. In this case, the thickness of the first micro-structure 21 is its radius, and the width and the length of the first micro-structure 21 are both its diameters.

For another example, as shown in FIG. 3A, the segment Q of the outer border of the cross section of the first micro-structure 21 facing away from the transparent base 201 is a segment of the circle. For example, as shown in FIG. 3B, the segment of the outer border of the cross section of the first micro-structure 21 facing away from the transparent base 201 is a segment of the free curve.

In some examples, as shown in FIG. 3A, the shape of each first micro-structure 21 is the same. In some other examples, the shapes of some of the plurality of first micro-structures 21 are the same. In some other examples, the shapes of two adjacent first micro-structures 21 are different. In some other examples, as shown in FIG. 3B, the shapes of the plurality of first micro-structures 21 are randomly set. Of course, the shapes of the first micro-structures 21 are not limited thereto, and may be set according actual needs. For example, the shapes of two adjacent first micro-structures 21 are the same, but are different from shapes of other first micro-structures 21.

In some examples, as shown in FIG. 3A, the plurality of first micro-structures 21 are distributed uniformly. In some other examples, some of the plurality of first micro-structures 21 are distributed uniformly, and remaining first micro-structures 21 are distributed randomly. In some other examples, the plurality of first micro-structures 21 are distributed randomly. The distribution of the plurality of first micro-structures 21 is not limited thereto, and may be designed according to actual needs.

In some examples, as shown in FIGS. 3A and 3B, the plurality of first micro-structures 21 are distributed continuously, and completely covers the transparent layer 201.

In some examples, as shown in FIG. 3A, the plurality of first micro-structures 21 have a same length, a same width, a same thickness and a same shape, which may facilitate processing and make the light scattering more uniform.

In some other examples, as shown in FIG. 3B, lengths, widths, thicknesses and shapes of the plurality of first micro-structures 21 are randomly set. In this way, due to the randomness of the structure, the light scattering may be more uniform, and the colors and brightness of the light at different positions on the ceiling 400 or the object at a side of the screen may be basically consistent, thereby blurring the image on the ceiling 400 to a greater extent.

In this case, for example, the plurality of first micro-structures 21 are projections, and the plurality of first micro-structures 21 are distributed continuously. In this way, the transition of the projections may be smoother, and the light scattering may be improved.

In some other examples, the plurality of first micro-structures 21 include a plurality of first-type first micro-structures 21 and a plurality of second-type first micro-structures 21. The plurality of first-type first micro-structures 21 have a same shape, a same width, a same length and a same thickness. The plurality of second-type first micro-structures 21 have a same shape, a same width, a same length and a same thickness.

For example, multiple second-type first micro-structures 21 are provided between every two adjacent first-type first micro-structures 21. Along the vertical direction OY and/or the horizontal direction OZ, second-type first micro-structures 21 disposed at two sides of a first-type first micro-structure 21 are symmetrically distributed relative to the center of the first-type first micro-structure 21.

In some other examples, the plurality of first micro-structures 21 include a plurality of first-type first micro-structures 21 and a plurality of second-type first micro-structures 21. Multiple second-type first micro-structures 21 are provided between every two adjacent first-type first micro-structures 21. The plurality of first-type first micro-structures 21 have a same shape, a same width, a same length and a same thickness. Shapes, widths, lengths and thicknesses of the plurality of second-type first micro-structures 21 are randomly set.

In some embodiments, a difference between thicknesses of any two of the plurality of first micro-structures 21 is within a range from approximately 5 μm to approximately 100 μm, such as 5 μm, 15 μm, 25 μm, 35 μm, 45 μm, 55 μm, 65 μm, 75 μm, 85 μm, 95 μm, or 100 μm. In this way, the appearance of the first micro-structures 21 may be smoother, and problems such as easy dirt and accumulation of dust caused by grooves may be avoided.

An excessive curvature radius of the first micro-structure 21 may affect the scattering effect of the light. A too small curvature radius of the first micro-structure 21 may make it very difficult to form the transparent layer 100. Therefore, in some examples, the curvature radius of the first micro-structure 21 is within a range from approximately 30 μm to approximately 500 μm, such as 30 μm, 100 μm, 150 μm, 200 μm, 250 μm, 300 μm, 350 μm, 400 μm, 450 μm, or 500 μm. In this way, the scattering effect of the light may be ensured, and the difficulty of forming the transparent layer 100 may be reduced.

In some examples, the plurality of first micro-structures 21 are formed on the transparent base 201 through an injection molding process, a compression molding process or a coating process. In actual processing, the micro-structure layer may be formed through roll-to-roll extrusion coating by rollers. In this way, continuous production may be realized, and the production yield and efficiency may be high. For another example, the micro-structure layer may be formed through the compression molding process by flat-sheet molds. This molding process is easy. In some other examples, the plurality of first micro-structures 21 and the transparent base 201 are integrally formed through the injection molding process, and are made of a same material.

As shown in FIGS. 3A and 3B, the micro-structure layer may be the outermost layer of the Fresnel projection screen. In the micro-structure layer, the first micro-structures 21 are light diverging structures. Therefore, by adjusting the shape of the first micro-structure 21, it is possible to control a ratio of light refracted at the first micro-structure 21 to light reflected at the first micro-structure 21. In this case, a portion of light emitted by the projector 300 may pass through the first micro-structure 21 and enter the Fresnel layer 203, thereby displaying an image normally.

In the embodiments, the plurality of first micro-structures 21 are distributed on the light incident surface of the transparent base 201. Therefore, as shown in FIGS. 3A and 3B, light at a same position on a ceiling 400 or light at a same position on an object at a side of the Fresnel projection screen is formed by superposition of light scattered by the first micro-structures 21 at different positions on the transparent base 201. For example, as shown in FIGS. 3A and 3B, light scattered by the first micro-structures 21 at three different positions on the transparent base 201 is superimposed at one point on the ceiling 400. Therefore, the Fresnel projection screen in some embodiments of the present disclosure may prevent the image similar to the preset image from being formed on the ceiling 400 or on the object at the side of the Fresnel projection screen.

In addition, the light is scattered to regions around the Fresnel projection screen in all directions without being reflected to a specific region. Therefore, the Fresnel projection screen in some embodiments of the present disclosure may reduce light reflected onto the ceiling 400 or light reflected onto the object at the side of the Fresnel projection screen, thereby reducing brightness of the reflected light.

Figure 4A:
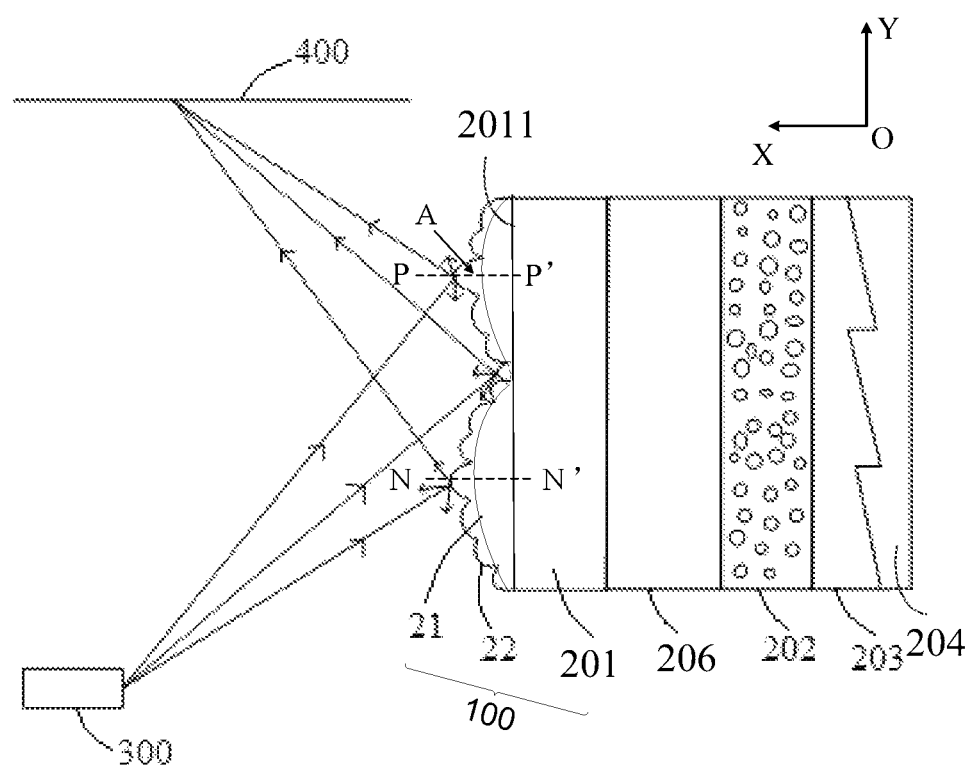
FIG. 4A is a schematic diagram of yet another Fresnel projection screen, in accordance with some embodiments.
Figure 4B:
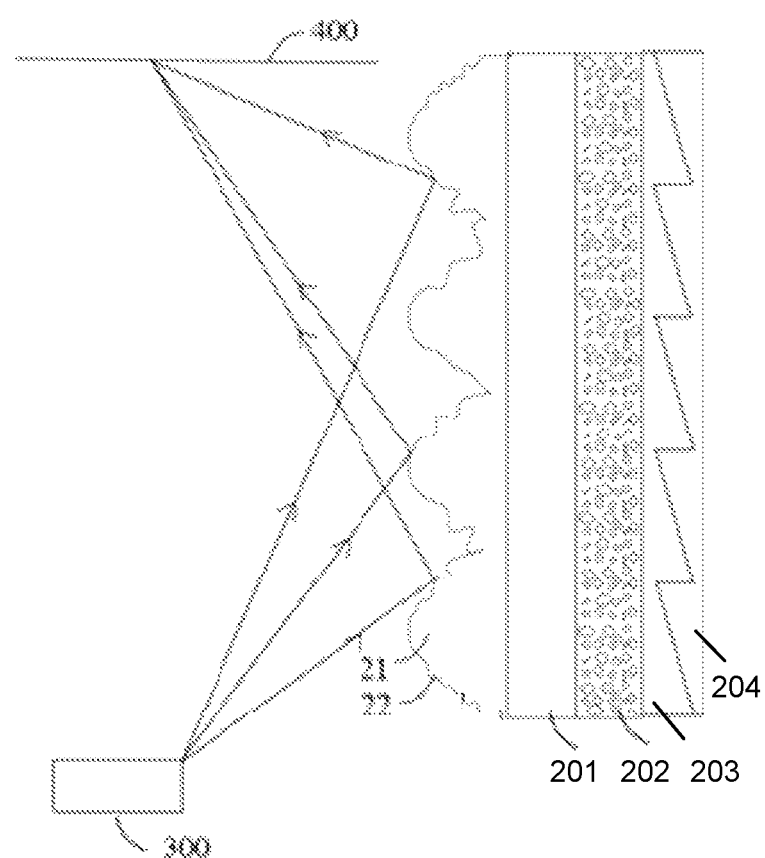
FIG. 4B is a schematic diagram of yet another Fresnel projection screen, in accordance with some embodiments.
Figure 4C:
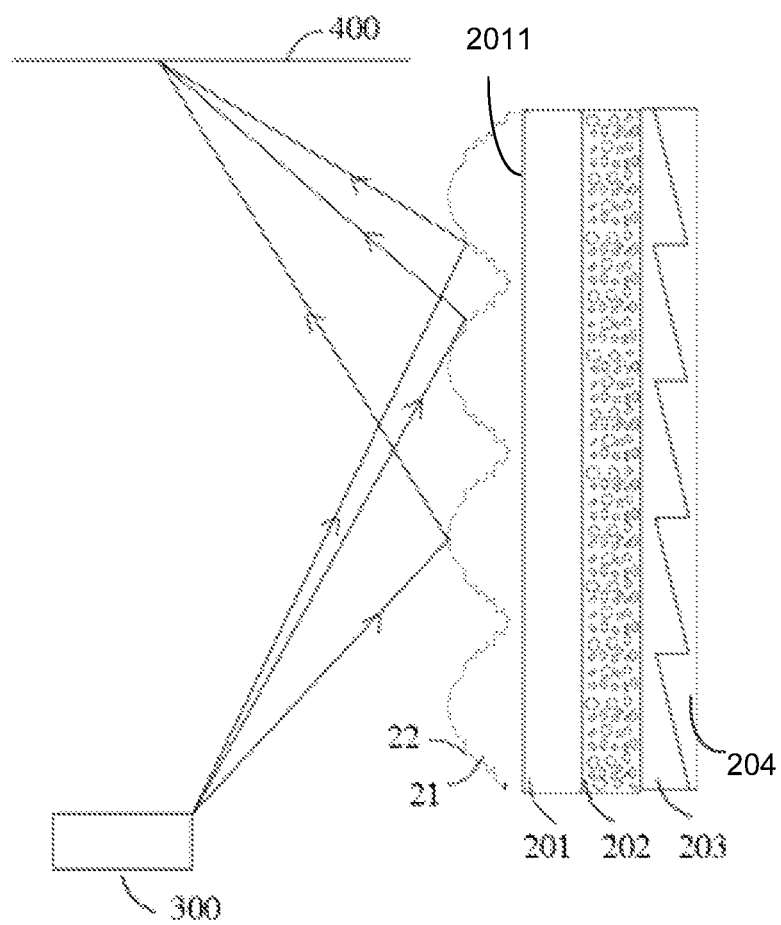
FIG. 4C is a schematic diagram of yet another Fresnel projection screen, in accordance with some embodiments.

In some other embodiments, as shown in FIGS. 4A to 4C, the micro-structure layer includes a first micro-structure layer and a second micro-structure layer disposed on a surface of the first micro-structure layer facing away from the transparent base 201. The first micro-structure layer includes a plurality of first micro-structures 21, and the second micro-structure layer includes a plurality of second micro-structures 22.

As shown in FIGS. 4A to 4C, the micro-structure layer may be the outermost layer of the Fresnel projection screen. In the micro-structure layer, the first micro-structures 21 and the second micro-structures 22 are all light diverging structures. Therefore, by adjusting shapes of the first and second micro-structures, it is possible to control a ratio of light refracted at the micro-structure to light reflected at the micro-structure. In this case, a portion of light emitted by the projector 300 may pass through the first and second micro-structures and enter the Fresnel layer 203, thereby displaying an image normally.

In the embodiments, the first and second micro-structures 21 and 22 are distributed on the light incident surface of the transparent base 201. Therefore, as shown in FIGS. 4A to 4C, light at a same position on a ceiling 400 or light at a same position on an object at the light incident side of the Fresnel projection screen is formed by superposition of light scattered by the first and second micro-structures 21 and 22 at different positions on the transparent base 201. For example, as shown in FIGS. 4A to 4C, light scattered by the first micro-structures 21 and the second micro-structures 22 at three different positions on the transparent base 201 is superimposed at one point on the ceiling 400. Therefore, the Fresnel projection screen in some embodiments of the present disclosure may prevent the image similar to the preset image from being formed on the ceiling 400 or on the object at the side of the Fresnel projection screen.

In addition, the light is scattered to regions around the Fresnel projection screen in all directions without being reflected to a specific region. Therefore, the Fresnel projection screen in some embodiments of the present disclosure may reduce light reflected onto the ceiling 400 or light reflected onto the object at the side of the Fresnel projection screen, thereby reducing brightness of the reflected light.

The Fresnel projection screen is, for example, a front projection screen, and as shown in FIG. 4A, the projector 300 may be placed below a center perpendicular line of the Fresnel projection screen at the light incident side of the Fresnel projection screen.

It will be noted that the descriptions of the first micro-structure 21 and the second micro-structure 22 in different embodiments can be referred to each other, and the similarities thereof may not be described again.

The micro-structure layer in some embodiments will be described below with reference to FIGS. 4A to 4C.

In some examples, a thickness of each second micro-structure 22 is the same. The thickness of the second micro-structure 22 refers to a thickness of the second micro-structure 22 at its apex. In an example where the second micro-structure 22 is the second micro-structure A in FIG. 4A, a surface of the second micro-structure 22 facing away from the transparent base 201 and a straight line PP' passing through the apex of the second micro-structure 22 and perpendicular to the surface of the adjacent first micro-structure 21 facing away from the transparent base 201 have a first intersection point, and a surface of the adjacent first micro-structure 21 facing away from the transparent base 201 and the straight line PP' have a second intersection point. The distance between the first intersection point and the second intersect point is the thickness of the second micro-structure 22. In this case, the straight line PP' is perpendicular to the surface of the transparent base 201 facing away from the first micro-structure 21.

In some other examples, the thicknesses of some of the plurality of second micro-structures 22 are the same. In some other examples, the thicknesses of two adjacent second micro-structures 22 are different. In some other examples, as shown in FIG. 4B, the thicknesses of the plurality of second micro-structures 22 are randomly set. Of course, the thicknesses of the second micro-structures 22 are not limited thereto, and may be set according actual needs. For example, the thicknesses of two adjacent second micro-structures 22 are the same, but are different from thicknesses of other second micro-structures 22.

In some examples, as shown in FIGS. 4A to 4C, a thickness of the first micro-structure 21 is greater than a thickness of the second micro-structure 22. In this way, a scattering effect of the light may be further improved. Of course, the thickness of the first micro-structure 21 may be equal to the thickness of the second micro-structure 22.

In some examples, a width of each second micro-structure 22 is the same. The width of the second micro-structure 22 refers to a maximum dimension of an orthographic projection of the second micro-structure 22 on a plane perpendicular to its thickness direction along a direction substantially parallel to the vertical direction OY. In the example where the second micro-structure 22 is the second micro-structure A in FIG. 4A, a width of the second micro-structure 22 refers to a maximum dimension of an orthographic projection of the second micro-structure 22 on the transparent base 201 in the vertical direction OY.

In some other examples, the widths of some of the plurality of second micro-structures 22 are the same. In some other examples, the widths of two adjacent second micro-structures 22 are different. In some other examples, as shown in FIG. 4B, the widths of the plurality of second micro-structures are randomly set. Of course, the widths of the second micro-structures 22 are not limited thereto, and may be set according actual needs. For example, the widths of two adjacent second micro-structures 22 are the same, but are different from widths of other second micro-structures 22.

In some examples, as shown in FIGS. 4A to 4C, the width of the first micro-structure 21 is greater than the width of the second micro-structure 22. Of course, the width of the first micro-structure 21 may also be less than the width of the second micro-structure 22.

In some examples, a length of each second micro-structure 22 is the same. The length of the second micro-structure 22 refers to a maximum dimension of the orthographic projection of the second micro-structure 22 on the plane perpendicular to its thickness direction along a direction substantially parallel to the horizontal direction OZ. In the example where the second micro-structure 22 is the second micro-structure A in FIG. 4A, the length of the second micro-structure 22 refers to a maximum dimension of the orthographic projection of the second micro-structure 22 on the transparent base 201 in the horizontal direction OZ.

It will be noted that depending on the position of the second micro-structure 22 on the first micro-structure 21, the length direction, the width direction and the thickness direction of the second micro-structure 22 may change, but the essence of the definitions of the length, the width and the thickness will not change. With regard to other second micro-structures 22 except the second micro-structure A, reference may be made to the definition of the second micro-structure A in FIG. 4A.

In some other examples, the lengths of some of the plurality of second micro-structures 22 are the same. In some other examples, the lengths of two adjacent second micro-structures 22 are different. In some other examples, as shown in FIG. 4B, the lengths of the plurality of second micro-structures 22 are randomly set. Of course, the lengths of the second micro-structures 22 are not limited thereto, and may be set according actual needs. For example, the lengths of two adjacent second micro-structures 22 are the same, but are different from lengths of other second micro-structures 22.

In some examples, as shown in FIGS. 4A to 4C, the length of the first micro-structure 21 is greater than the length of the second micro-structure 22. Of course, the length of the first micro-structure 21 may also be equal to the length of the second micro-structure 22.

In some examples, the plurality of second micro-structures 22 are distributed uniformly. In some other examples, some of the plurality of second micro-structures 22 are distributed uniformly, and remaining second micro-structures 22 are distributed randomly. In some other examples, the plurality of second micro-structures 22 are distributed randomly. The distribution of the plurality of second micro-structures 22 is not limited thereto, and may be designed according to actual needs.

In some examples, the first micro-structure 21 is selected from a group consisting of an arc-shaped protrusion, a conical frustum, a column, a cone, a prism, a groove and a combination thereof. The second micro-structure 22 is selected from a group consisting of an arc-shaped protrusion, a conical frustum, a column, a cone, a prism, a groove and a combination thereof.

For example, the first micro-structure 21 and the second micro-structure 22 are arc-shaped protrusions, and the orthographic projections of the first micro-structure 21 and the second micro-structure 22 on the first surface 2011 are both in a shape of a circle. In this case, the lengths and widths of the first micro-structure 21 and the second micro-structure 22 are all diameters.

For another example, the first micro-structure 21 and the second micro-structure 22 are columns, and the orthographic projections of the first micro-structure 21 and the second micro-structure 22 on the first surface 2011 are both in a shape of a square. In this case, the lengths and widths of the first micro-structure 21 and the second micro-structure 22 are all side lengths.

When the first micro-structure 21 and the second micro-structure 22 have other shapes, their dimensions changes accordingly with their shapes.

As shown in FIGS. 4A to 4C, for example, the first micro-structure 21 and the second micro-structure 22 are both protrusions, such as arc-shaped protrusions, and a curvature radius of the second micro-structure 22 is less than a curvature radius of the first micro-structure 21.

It will be noted that, an excessive curvature radius of the first micro-structure 21 and an excessive curvature radius of the second micro-structure 22 may affect the scattering effect of the light. A too small curvature radius of the first micro-structure 21 and a too small curvature radius of the second micro-structure 22 may make it very difficult to form the transparent layer 100. In some examples, the curvature radius of the first micro-structure 21 is within a range from approximately 30 μm to approximately 500 μm, and the curvature radius of the second micro-structure 22 is within a range from approximately 10 μm to approximately 100 μm. In this way, the scattering effect of the light may be ensured, and the difficulty of forming the transparent layer 100 may be reduced.

For example, the curvature radius of the first micro-structure 21 may be 30 μm, 50 μm, 100 μm, 200 μm, 300 μm, 400 μm, or 500 μm. For example, the curvature radius of the second micro-structure 22 may be 10 μm, 30 μm, 50 μm, 70 μm, 90 μm, or 100 μm.

In some embodiments, as shown in FIGS. 4A to 4C, the first micro-structure 21 is substantially different from the second micro-structure 22. For example, the first micro-structure 21 and the second micro-structure 22 are compared in terms of thickness, length, width, shape, distribution and other factors. If there are difference(s) in one or more of these factors, it is considered that the first micro-structure 21 is different from the second micro-structure 22.

In some examples, as shown in FIGS. 4A to 4C, the length, width and thickness of the second micro-structure 22 are less than the length, width and thickness of the first micro-structure 21, respectively. In this case, the shapes of the first micro-structure 22 and the second micro-structure 21 may be the same or different. It will be noted that, each of the shapes of the first micro-structure 22 and the second micro-structure 21 refers to the shape of an outer surface composed of its surfaces except its surface touching the transparent base 201.

For example, as shown in FIG. 4A, the plurality of second micro-structures 22 completely cover the first micro-structure layer. In this case, multiple second micro-structures 22 may completely cover a first micro-structure 21, and the multiple second micro-structures 22 are symmetrical with respect to the central axis of the first micro-structure 21 along the horizontal direction OZ and/or the vertical direction OY of the Fresnel projection screen. For example, as shown in FIG. 4A, in a cross section passing through the center of the first micro-structure 21, the second micro-structures 22 on the first micro-structure 21 are symmetrical with respect to the central axis NN' of the first micro-structure 21 along the vertical direction OY of the Fresnel projection screen. The central axis NN' may be a line joining an apex of the first micro-structure 21 and a center of the side of the first micro-structure 21 touching the transparent base 201. For example, the first micro-structure 21 has rotational symmetry with respect to its central axis NN'.

In this case, for example, the plurality of first micro-structures 21 have a same shape, a same length, a same thickness and a same width. For another example, some of the plurality of first micro-structures 21 have a same shape, a same length, a same thickness and a same width. Of course, the plurality of first micro-structures 21 may have other shapes and sizes.

In addition, for example, the plurality of second micro-structures 22 have a same shape, a same length, a same thickness and a same width. For another example, some of the plurality of second micro-structures 22 have a same shape, a same length, a same thickness and a same width. Of course, the plurality of second micro-structures 22 may have other shapes and sizes.

In addition, for example, as shown in FIG. 4A, in the thickness direction OX of the Fresnel layer 203, a maximum distance between a surface of at least one second micro-structure 22 facing away from the transparent base 201 and the first surface 2011 of the transparent base 201 is greater than a maximum distance between a surface of the first micro-structure 22 facing away from the transparent base 201 and the first surface 2011 of the transparent base 201.

For another example, as shown in FIG. 4B, the plurality of second micro-structures 22 completely cover the first micro-structure layer. In this case, multiple micro-structures 22 can completely cover the first micro-structure 21. The plurality of first micro-structures 21 have a same shape, a same length, a same width, and a same thickness. Shapes, lengths, widths and thicknesses of the plurality of second micro-structures 22 are randomly set. Due to the randomness of the structure, the light scattering may be more uniform, and the colors and brightness of the light at different positions on the ceiling 400 or an object at a side of the screen may be basically the same, thereby blurring the image to a greater extent.

For another example, as shown in FIG. 4C, the plurality of second micro-structures 22 cover a portion of the first micro-structure layer. In this case, multiple second micro-structures 22 may only cover the side surface of the first micro-structure 21, and are symmetrical with respect to the central axis of the first micro-structure along a horizontal and/or vertical direction of the Fresnel projection screen. The side surface of the first micro-structure 21 may refer to a portion of an outer surface of the first micro-structure 21 that lies on the left and right of the first micro-structure 21 as viewed from the front or back. In this way, the transition of the micro-structures may be smoother, and the light scattering effect may be improved.

In this case, for example, the plurality of first micro-structures 21 have a same shape, a same length, a same width and a same thickness. The plurality of second micro-structures 22 have a same shape, a same length, a same width and a same thickness. Of course, the plurality of first micro-structures 21 and the plurality of second micro-structures 22 may have other shapes and other sizes. For example, the shapes, lengths, widths and thicknesses of the plurality of second micro-structures 22 are randomly set.

In addition, for example, as shown in FIG. 4C, in the thickness direction of the Fresnel layer 203, a maximum distance between the surface of the second micro-structures 22 facing away from the transparent base 201 and the first surface 2011 of the transparent base 201 is less than a maximum distance between the surface of the first micro-structure 21 facing away from the transparent base 201 and the first surface 2011 of the transparent base 201.

In the above embodiments, the plurality of first micro-structures 201 may completely cover the transparent base 201, or only cover a portion of the transparent base 201.

In some other examples, at least two first micro-structures 21 have a same shape, a same thickness, a same length and a same width, and at least two second micro-structures 22 have a same shape, a same thickness, a same length, and a same width.

In the above embodiments, the plurality of first micro-structures 21 may have a same shape, a same thickness, a same width and a same length. The plurality of second micro-structures 22 may have a same shape, a same thickness, a same width and a same length. In this way, on the one hand, the first and second micro-structures 21 and 22 of the Fresnel projection screen may be easily formed, and on the other hand, the light may be scattered uniformly. Therefore, colors of light at different positions on the ceiling 400 or on the object at the side of the Fresnel projection screen may basically tend to be the same. Further, the formed image is blurred to a great extent.

In some other examples, the plurality of first micro-structures 21 have a same shape, a same thickness, a same width and a same length, and shapes, thicknesses, widths and lengths of the plurality of second micro-structures 22 are randomly set.

In some examples, the transparent base 201, the first micro-structures 21 and the second micro-structures 22 are integrally formed. In this way, the molding method may be simple and it may be easy to realize the molding.

In some examples, as shown in FIGS. 4B and 4C, the plurality of first micro-structures 21 and the plurality of second micro-structures 22 are integrally formed. The plurality of first micro-structures 21 and the plurality of second micro-structures 22 can be formed through roll-to-roll extrusion coating by rollers. In this way, continuous production may be realized, and the production yield and efficiency may be high. In some other examples, the plurality of first micro-structures 21 and the plurality of second micro-structures 22 may be formed through the compression molding process by flat-sheet molds. This molding process may be easy.

In some other examples, the plurality of first micro-structures 21 and the transparent base 201 are integrally formed, and are made of a same material. The plurality of second micro-structures 22 are coated on the first micro-structures 21, and are made of a material different from that of the first micro-structures 21.

For example, the plurality of first micro-structures 21 are formed through an injection molding process, a compression molding process or a coating process, and the plurality of second micro-structures 22 are formed through the coating process. In this way, the plurality of first micro-structures 21 and the plurality of second micro-structures 22 may be easily formed.

In some other embodiments, the micro-structure layer has the multilayer structure, and includes first micro-structure layers each including the first micro-structures 21, and second micro-structure layers each including the second micro-structures 22. At least one first micro-structure layer and at least one second micro-structure layer are alternately arranged. For example, one first micro-structure layer and one second micro-structure layer are alternately arranged, or multiple first micro-structure layers and multiple second micro-structure layers are alternately arranged.

In some examples, all first micro-structures 21 in a same layer have a same shape, a same thickness, a same length and a same width, and all second micro-structures 22 in a same layer have a same shape, a same thickness, a same length and a same width.

In some other examples, at least two first micro-structures 21 in the same layer have different shapes, and at least two second micro-structures 22 in the same layer have different shapes. For example, at least two first micro-structures 21 in the same layer have a combined shape of a conical frustum shape, a columnar shape and a conical shape, and at least two second micro-structures 22 in the same layer have a combined shape of an arc protrusion shape, a conical frustum shape and a columnar shape.

In some embodiments, a segment of an outer border of the cross section of each of the first micro-structure 21 and the second micro-structure 22 away from the transparent base 201 is one segment of an arc such as a circle, an ellipse, a parabola, a hyperbola or a free curve, and is smooth.

In some examples, a difference between thicknesses of the first micro-structure 21 and the second micro-structure 22 is within a range from approximately 5 µm to approximately 100 µm, such as 5 µm, 15 µm, 25 µm, 35 µm, 45 µm, 55 µm, 65 µm, 75 µm, 85 µm, 95 µm, 100 µm. In this way, the appearance of the first micro-structures 21 may be smoother, and problems such as easy dirt and accumulation of dust caused by structural grooves may be avoided.

In the Fresnel projection screen of some embodiments, if the thickness P of the transparent layer 100 is too small, it may be difficult to make mold opening. Moreover, if the thickness P of the transparent layer 100 is too large, the material may be wasted, it may be difficult to carry the Fresnel projection screen, and the light loss may be increased. Therefore, in some examples, the thickness P of the transparent layer 100 is within a range from approximately 100 µm to approximately 1000 µm. In this way, on the one hand, the difficulty of the mold opening may be reduced; on the other hand, the material may be saved, the Fresnel projection screen may be easily carried, and the optical loss may be reduced.

The thickness P of the transparent layer 100 refers to a maximum distance between a surface of the transparent layer 100 facing away from the Fresnel layer 203 and a surface of the transparent layer 100 facing the Fresnel layer 203 in the thickness direction OX of the Fresnel layer 203.

For example, the thickness P of the transparent layer 100 may be 100 µm, 200 µm, 300 µm, 400 µm, 500 µm, 600 µm, 700 µm, 800 µm, 900 µm, or 1000 µm.

In these embodiments, the micro-structure layer is the outermost layer of the Fresnel projection screen, i.e., disposed on a light incident side of the transparent base 201. For example, a back face of the transparent base 201 (a surface of the transparent base 201 facing away from the projector 300) in the transparent layer 100 is bonded to an optical layer that is closer to the inside of the Fresnel projection screen than the transparent layer 100 via an optical adhesive, such as an optically clear adhesive (OCA)

or silica gel. For example, the transparent base 201 may be replaced with the optical layer.

With continued reference to FIGS. 4A to 4C, in some embodiments, the Fresnel projection screen further includes a diffusion layer 202 between the transparent layer 100 and the Fresnel layer 203. The diffusion layer 202 is capable of homogenizing light beams. A surface of the Fresnel layer 203 away from the diffusion layer 202 is a reflective surface. The Fresnel layer 203 is configured such that obliquely incident light beams are reflected by the surface of the Fresnel layer 203 away from the diffusion layer 202 at a horizontal viewing angle.

With continued reference to FIG. 4A, in some embodiments, the Fresnel projection screen further includes a color layer 206 between the transparent layer 100 and the diffusion layer 202. The optical layer described above may be the color layer 206, the diffusion layer 202 or the Fresnel layer 203. The transparent base 201 is bonded to the color layer 206. The color layer 206 is configured to have different transmittances to light of different wavelengths, so that the Fresnel projection screen may restore primary colors of the preset image to a maximum extent.

In some embodiments, the Fresnel projection screen further includes a protective layer disposed at a light incident side of the color layer 206. The transparent base 201 is bonded to the protective layer. The protective layer (with high transmittance) is configured to have a waterproof performance and an impact resistance.

FIGS. 5A to 12 shows some other Fresnel projection screens according to some embodiments of the present disclosure, in which at least one micro-structure layer is disposed inside each Fresnel projection screen. As shown in FIGS. 5A to 12, the Fresnel projection screen includes the transparent base 201, the diffusion layer 202, the Fresnel layer 203 and a reflective layer 204 that are arranged in the light incident direction. The Fresnel projection screen further includes at least one micro-structure layer 205. Each micro-structure layer 205 is configured to converge a transmission angle of the light. The at least one micro-structure layer 205 may be disposed between the transparent base 201 and the diffusion layer 202, and/or between the diffusion layer 202 and the Fresnel layer 203.

Figure 7:
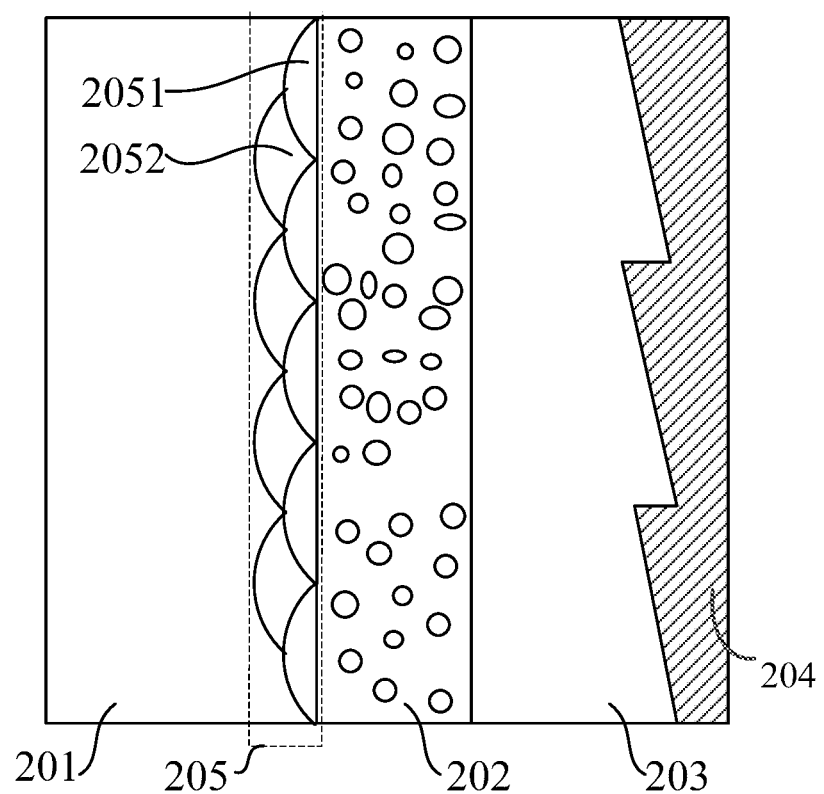
FIG. 7 is a diagram showing a variation of the micro-structure layer in the Fresnel projection screen shown in FIG. 5A.

For example, as shown in FIGS. 5A, 5B, 8A, 8B, 9A, 9B, and 10 to 12, the at least one micro-structure layer 205 includes one micro-structure layer 205, which is located between the diffusion layer 202 and the Fresnel layer 203. For another example, as shown in FIG. 7, the at least one micro-structure layer 205 includes one micro-structure layer 205, which is located between the transparent base 201 and the diffusion layer 202. For another example, the at least one micro-structure layer 205 includes two micro-structure layers 205, one of which is disposed between the diffusion layer 202 and the Fresnel layer 203, and the other is disposed between the transparent base 201 and the diffusion layer 202. The micro-structure layer 205 is configured to converge the light reaching the Fresnel layer 203, and thus the micro-structure layer 205 may be provided at any position on an optical path of the light travelling to the Fresnel layer 203.

It will be noted that the descriptions of the Fresnel projection screen in different embodiments may refer to each other, and similarities thereof are not described again.

Figure 8A:
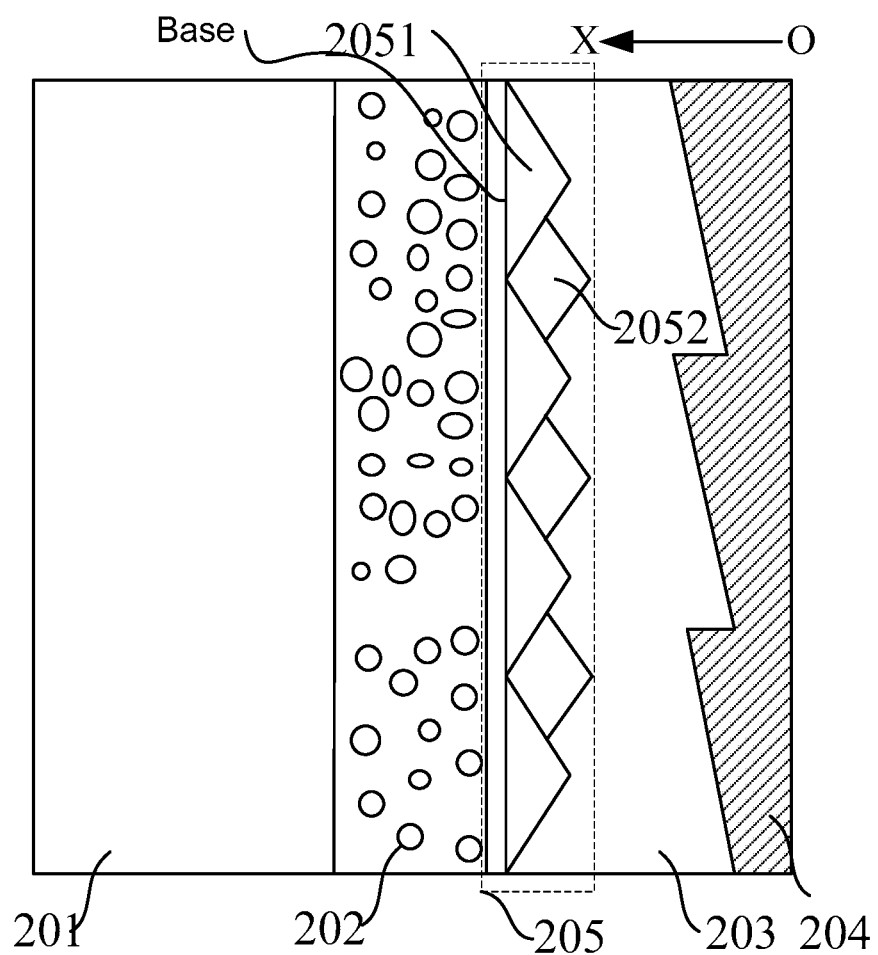
FIG. 8A is a diagram showing another variation of the micro-structure layer in the Fresnel projection screen shown in FIG. 5A.
Figure 8B:
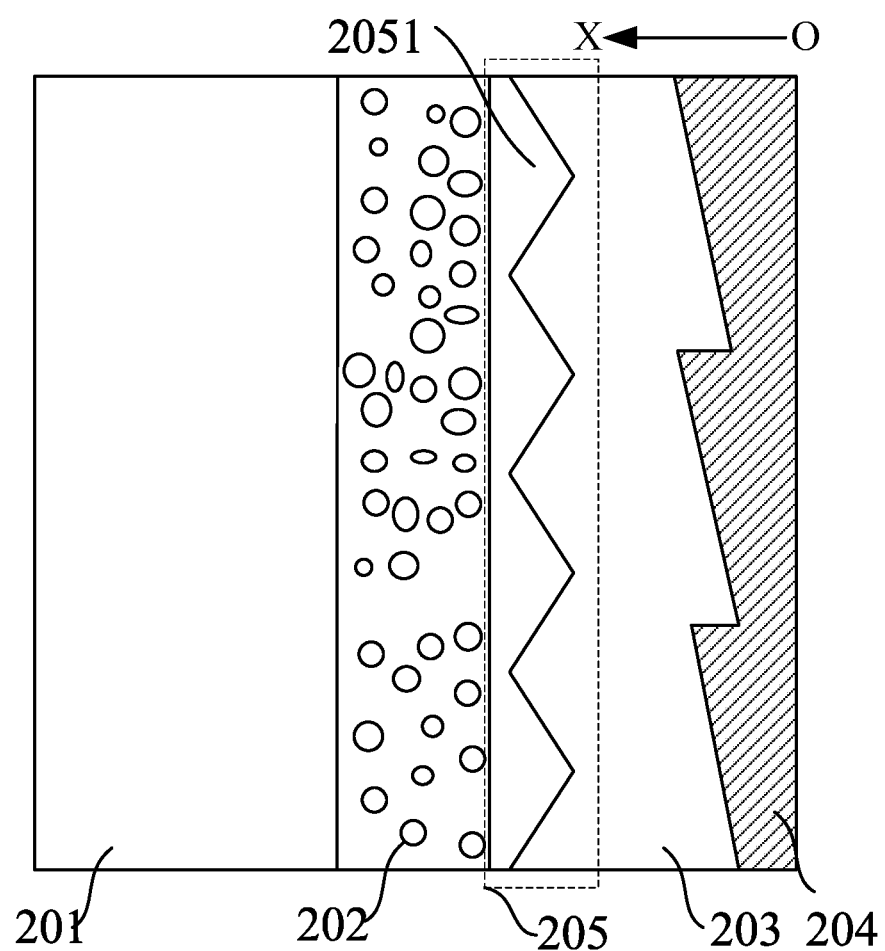
FIG. 8B is a schematic diagram of yet another Fresnel projection screen including a micro-structure layer having a single-layer structure, in accordance with some embodiments.
Figure 8C:
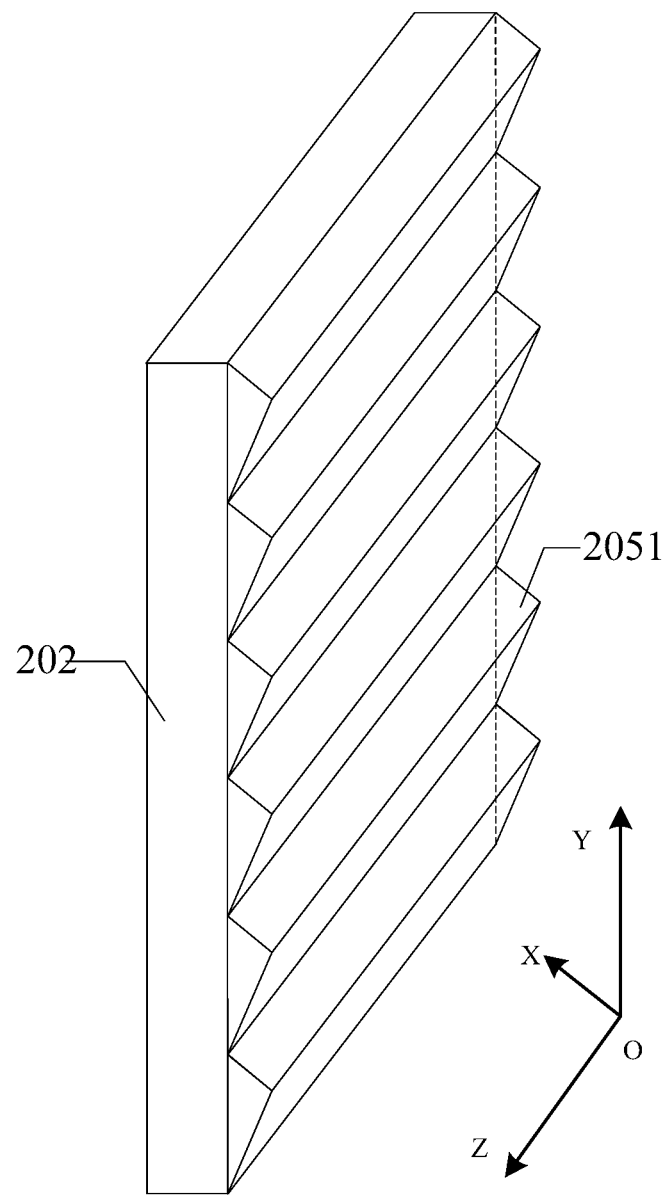
FIG. 8C is a perspective view of the micro-structure layer shown in FIG. 8B.
Figure 9A:
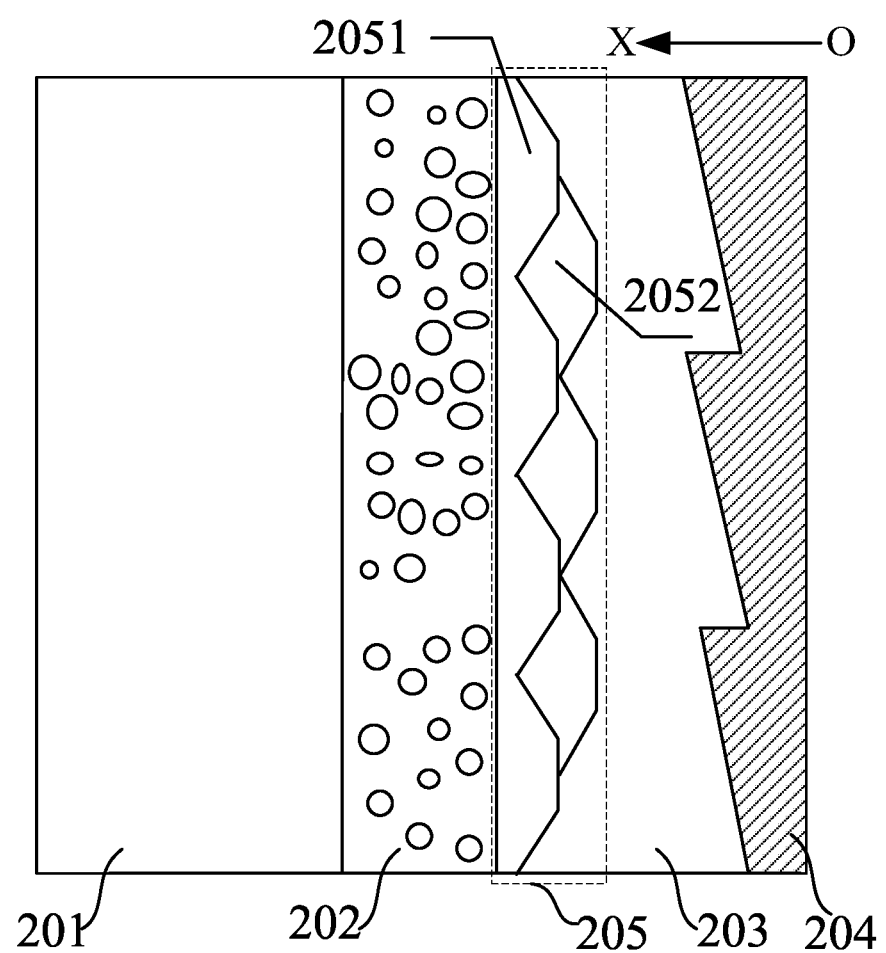
FIG. 9A is a diagram showing yet another variation of the micro-structure layer in the Fresnel projection screen shown in FIG. 5A.
Figure 9B:
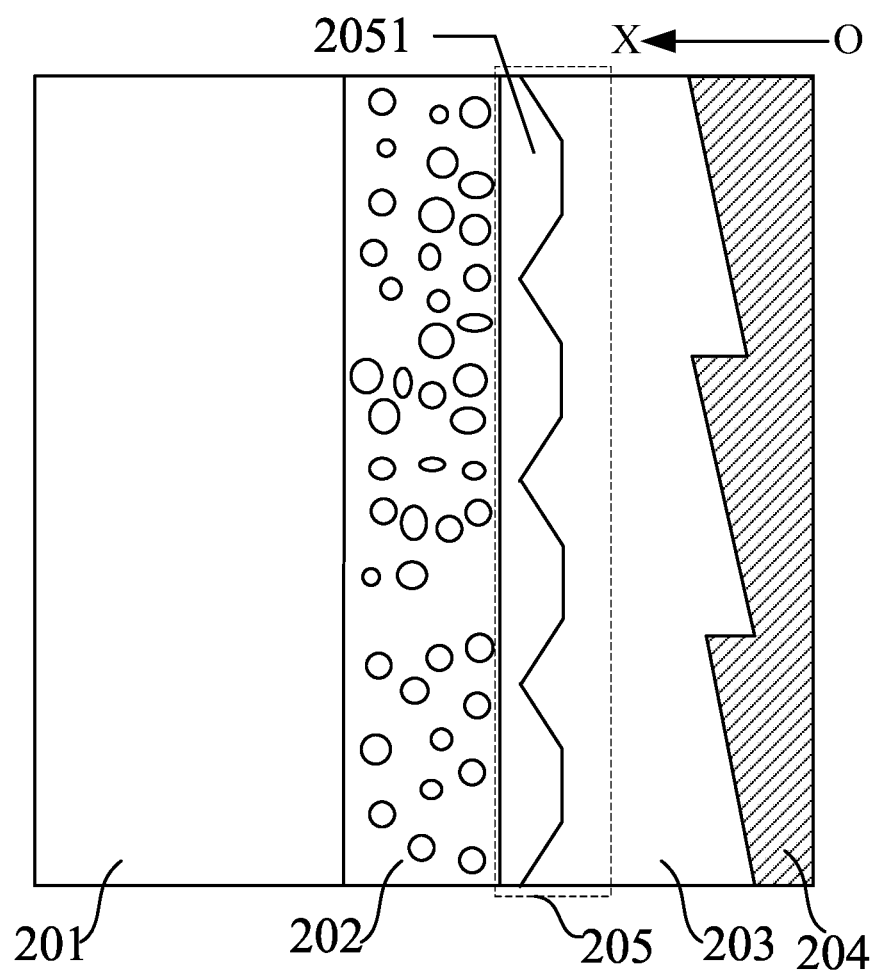
FIG. 9B is a schematic diagram of yet another Fresnel projection screen including a micro-structure layer having a single-layer structure, in accordance with some embodiments.
Figure 9C:
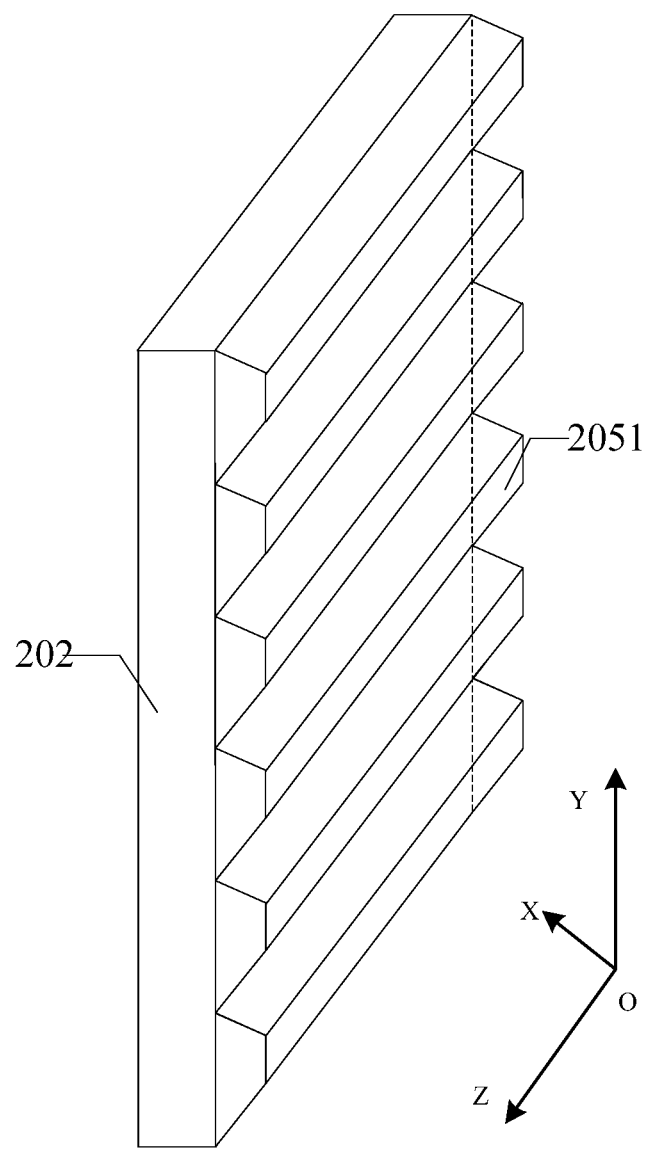
FIG. 9C is a perspective view of the micro-structure layer shown in FIG. 9B.

FIGS. 5A to 7 and 10 to 12 show examples in which the micro-structures in the micro-structure layer 205 are arc-shaped protrusions. FIGS. 8A to 8C show examples in which the micro-structures in the micro-structure layer 205 are pyramids. FIGS. 9A to 9C show examples in which the micro-structures in the micro-structure layer 205 are prismatic bodies. It will be noted that FIGS. 5A to 12 only show part of shapes of the micro-structures in the micro-structure layer 205. The micro-structures in the micro-structure layer 205 may have other shapes, and the arrangements thereof can be referred to the related embodiments described with reference to FIGS. 5A to 12.

In some examples, as shown in FIGS. 5A to 7, the at least one micro-structure layer 205 is disposed at at least one side of the diffusion layer 202. Each micro-structure layer 205 includes at least the first micro-structure layer, and the first micro-structure layer includes first protrusions 2051 extending in the horizontal direction OZ of the Fresnel projection screen.

Figure 5A:
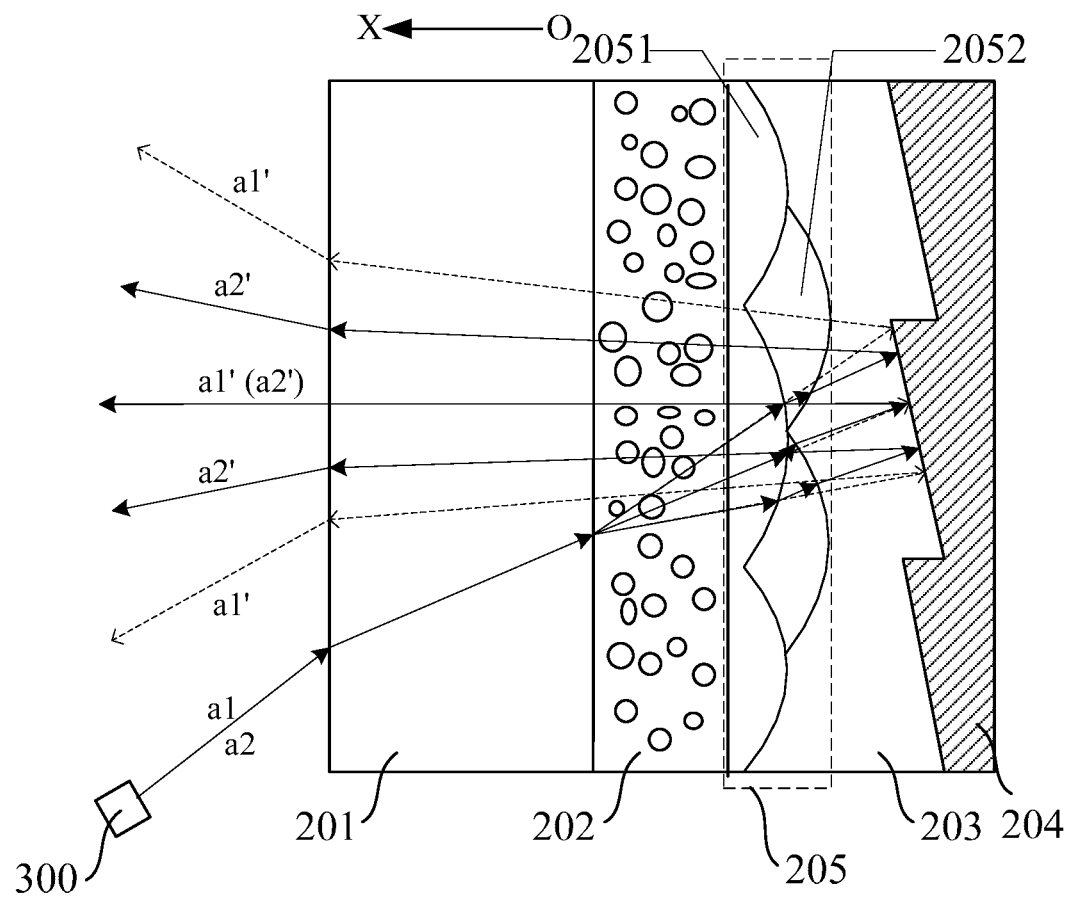
FIG. 5A is a schematic diagram of yet another Fresnel projection screen including a micro-structure layer having a multilayer structure, in accordance with some embodiments.

For example, as shown in FIGS. 5A and 6, the micro-structure layer further includes the second micro-structure layer disposed on a surface of the first micro-structure layer away from the diffusion layer 202. The second micro-structure layer includes second protrusions 2052 extending in the horizontal direction OZ of the Fresnel projection screen. The first protrusions 2051 and the second protrusions 2052 are configured to converge the incident light along the vertical direction OY of the Fresnel projection screen.

In will be noted that, if the protrusions extend in a direction in which a viewing angle needs to be enlarged, the viewing angle in this direction may be enlarged. As such, the viewer has a large movement range within the viewing angle, and the image on the Fresnel projection screen may be clearly viewed within the viewing angle. For example, in practical applications, the viewer moves in the horizontal direction OZ parallel to ground. Therefore, a wide viewing range in the horizontal direction OZ parallel to the ground is needed, and a requirement for a viewing range in the vertical direction OY perpendicular to the ground is not high. In this case, an extending direction of the protrusions may be set as the horizontal direction OZ of the Fresnel projection screen, so that the viewing angle in the vertical direction OY of the Fresnel projection screen is reduced to obtain a large viewing angle in the horizontal direction OZ.

The transmission paths of the light beams are described below with reference to FIGS. 5A and 5B, in which solid arrows represent optical paths in the Fresnel projection screen that includes the micro-structure layer 205, and dotted arrows represent optical paths in the Fresnel projection screen that does not include the micro-structure layer 205.

Figure 5B:
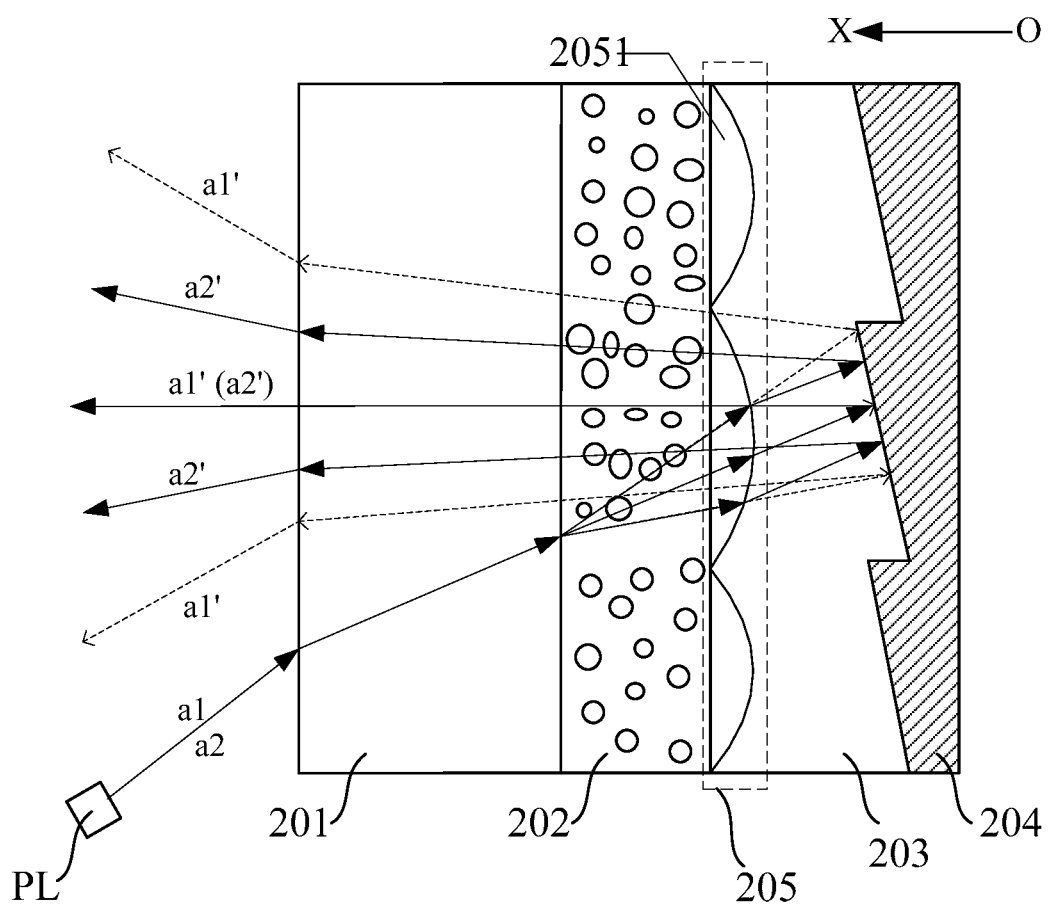
FIG. 5B is a schematic diagram of yet another Fresnel projection screen including a micro-structure layer having a single-layer structure, in accordance with some embodiments.

As shown in FIGS. 5A and 5B, light beams a1 that are emitted by the projector 300 pass through the transparent base 201, and then enter the diffusion layer 202. The light beams a1 are homogenized under a diffusion effect of the diffusion layer 202. If the micro-structure layer 205 is not provided, the light beams a1 will directly enter the Fresnel layer 203, and are reflected by the reflective surface of the Fresnel layer 203 to exit though the light incident surface of the transparent base 201. A range covered by light beams a1' that finally exit is a viewing range where the viewer may view the image on the projection screen, for example, a range shown by dotted lines a1'.

In a case where the micro-structure layer 205 is provided between the diffusion layer 202 and the Fresnel layer 203, light beams a2 that are emitted by the projector 300 and pass through the transparent base 201 are diffused by the diffusion layer 202, and then enter the first protrusions 2051. The first protrusions 2051 converge the light beams a2 in the vertical direction OY of the Fresnel projection screen. Then, the light beams a2 enter the second protrusions 2052 (if there are second protrusions 2052), and the second protrusions 2052 converge the light beams a2 in the vertical direction OY of the Fresnel projection screen. After the light beams a2 are reflected by the reflective surface of the Fresnel layer 203, the viewing angle covered by light beams a2' that finally exit in the vertical direction OY becomes small. According to the law of conservation of energy, if the viewing angle in the vertical direction OY becomes small, the viewing angle in the horizontal direction OZ perpendicular to the vertical direction OY may become large accordingly, or brightness when the image is viewed in the horizontal direction OZ perpendicular to the vertical direction OY may increase accordingly.

In addition, as shown in FIG. 6, the first protrusions 2051 and the second protrusions 2052 included in the micro-structure layer 205 are arranged in parallel. The first and second protrusions have the same extending direction, and all extend in the horizontal direction OZ of the Fresnel projection screen. In this way, the incident light may be converged in the vertical direction OY of the Fresnel projection screen, thereby enlarging the viewing angle in the horizontal direction OZ.

In some examples, as shown in FIG. 6, in the vertical direction OY of the Fresnel projection screen, a width W1 of the first protrusion 2051 and a width W2 of the second protrusion 2052 are equal. For example, in the vertical direction OY of the Fresnel projection screen, a width W1 of each first protrusion 2051 and a width W2 of each second protrusion 2052 are equal. Herein, the width of a protrusion refers to a distance between two edges of a maximum cross section of the protrusion in the vertical direction OY of the Fresnel projection screen. In other words, the width W of a protrusion refers to a maximum dimension of the orthographic projection of the protrusion on the diffusion layer 202 in the vertical direction OY of the Fresnel projection screen.

For example, as shown in FIG. 6, the width W1 of the first protrusion 2051 refers to a dimension of the orthographic projection of the first protrusion 2051 on the diffusion layer 202 in the vertical direction OY of the Fresnel projection screen, and the width W2 of the second protrusion 2052 refers to a maximum dimension of the orthographic projection of the second protrusion 2051 on the diffusion layer 202 (such as a distance between two points where the surface of the second protrusion 2052 and the surfaces of two adjacent first protrusion 2051 intersect) in the vertical direction OY of the Fresnel projection screen. In this way, the difficulty of forming the transparent layer 100 may be reduced.

For example, as shown in FIG. 6, the width W1 of the first protrusion 2051 and the width W2 of the second protrusion 2052 may be set to be within a range from approximately 10 µm to approximately 500 µm, such as 10 µm, 100 µm, 200 µm, 300 µm, 400 µm, or 500 µm.

Considering a current manufacturing process, the width of a micro-structure in the Fresnel layer 203 are generally within a range from approximately 10 µm to approximately 200 µm, such as 10 µm, 30 µm, 50 µm, 70 µm, 90 µm, 120 µm, 150 µm, 180 µm or 200 µm. Therefore, corresponding to each micro-structure in the Fresnel layer 205, the width of the first protrusion 2051 and the width of the second protrusion 2052 in the micro-structure layer may be set to be the same as the width of the micro-structure in the Fresnel layer 2052 to ensure the converging effect of the micro-structure layer.

In some examples, as shown in FIG. 6, the thickness S1 of the first protrusion 2051 may be set to be within a range from approximately 10 µm to approximately 500 µm, such as 10 µm, 100 µm, 200 µm, 300 µm, 400 µm, or 500 µm. The thickness S1 of the first protrusion 2051 may be referred to the above description. In other words, as shown in FIG. 6, the thickness S1 of the first protrusion 2051 may refer to a maximum thickness of the cross section of the first protrusion 2051 in the protruding direction of the first protrusion 2051.

It will be noted that setting the thickness of the first protrusion 2051 to be too small will increase the manufacturing difficulty, and setting the thickness of the first protrusion 2051 to be too large will cause a thickness of the entire Fresnel projection screen to be increased, which does not satisfy a light and thin requirement of the Fresnel projection screen. In some examples, a thickness S2 of the second protrusion 2052 may be the same as the thickness S1 of the first protrusion 2051. As shown in FIG. 6, the thickness S2 of the second protrusion 2052 may refer to a difference between the maximum distance S from the surface of the second protrusion 2052 facing away from the diffusion layer 202 to the surface of the diffusion layer 202 facing the second protrusion 2052 in the thickness direction of the Fresnel layer 203, and the thickness S1 of the first protrusion 2051.

Therefore, in some examples, a combined thickness S of the first protrusion 2051 and the second protrusion 2052 (i.e., the maximum thickness of the micro-structure layer) may be set to be within a range from approximately 10 µm to approximately 500 µm, such as 10 µm, 100 µm, 200 µm, 300 µm, 400 µm, or 500 µm.

In some examples, as shown in FIGS. 5A to 12 and 24, a layer of first protrusions 2051 and a layer of second protrusions 2052 are stacked in the thickness direction OX of the Fresnel layer 203, and are staggered in the vertical direction OY of the Fresnel projection screen. The second protrusions 2052 are stacked on the first protrusions 2051, so that light (with a low degree of convergence) passing through two edges of each first protrusion 2051 in the vertical direction OY is converged by the second protrusions 2052 again. In this way, the light converged by the first protrusions 2051 and the second protrusions 2052 may be very uniform.

For example, edges of a second protrusion 2052 in the vertical direction OY are located on apexes of two first protrusions 2051 adjacent to the second protrusion 2052, respectively.

It will be noted that in a case where the protrusions are made of a same material, and refractive indexes at different positions are the same and uniform, in order to make each protrusion have the converging effect of the convex lens, there is a need to set a surface of the protrusion to have a non-planar structure, so that there is an optical path difference among light passing through different positions on the protrusion. In some examples, as shown in FIGS. 5A, 8A and 9A, along a direction pointing to the Fresnel layer 203 from the micro-structure layer, a dimension of a cross section of each of the first protrusions 2051 and the second protrusions 2052 in the vertical direction OY of the Fresnel projection screen decrease. In some other examples, the cross-sections of the first protrusions 2051 and the second protrusions 2052 are set in a mirror image manner on a basis of FIG. 5A to form the structure shown in FIG. 7. In this case, the micro-structure layer 205 is provided between the transparent base 201 and the diffusion layer 202, and may also converge the light.

In some examples, as shown in FIG. 5A, the cross sections of the first protrusions 2051 and the second protrusions 2052 perpendicular to the extending direction OZ of the protrusions may have a semicircular shape. In some other examples, as shown in FIGS. 8A, 8B and 8C, the cross sections of the first protrusions 2051 and the second protrusions 2052 perpendicular to the extending direction OZ of the protrusions have the triangular shape. In some other examples, as shown in FIGS. 9A, 9B and 9C, the cross sections of the first protrusions 2051 and the second protrusions 2052 perpendicular to the extending direction OZ of the protrusions have the trapezoidal shape. In practical applications, the cross sections of the protrusions may be set according to actual needs.

In some examples, as shown in FIGS. 5A, 6, 8A and 9A, the micro-structure layer 205 includes the first protrusions 2051 and the second protrusions 2052 that are stacked. The first protrusions 2051 and the second protrusions 2052 all extend in the horizontal direction OZ of the Fresnel projection screen. A refractive index of the second protrusions 2052 is less than a refractive index of the first protrusions 2051.

In some examples, the first protrusion 2051 and the second protrusion 2052 are made of photosensitive adhesives. For example, the difference in refractive index can be achieved by selecting photosensitive adhesives of different compositions, or the difference in refractive index can be achieved by adjusting the curvature radiuses of the first protrusion 2051 and the second protrusion 2052.

In some examples, the first protrusions 2051 in at least one first micro-structure layer are the same as the second protrusions 2052 in at least one second micro-structure layer. For example, the first protrusions 2051 in the at least one first micro-structure layer and the second protrusions 2052 in the at least one second micro-structure layer have a same thickness, shape, width, and extending direction.

Figure 10:
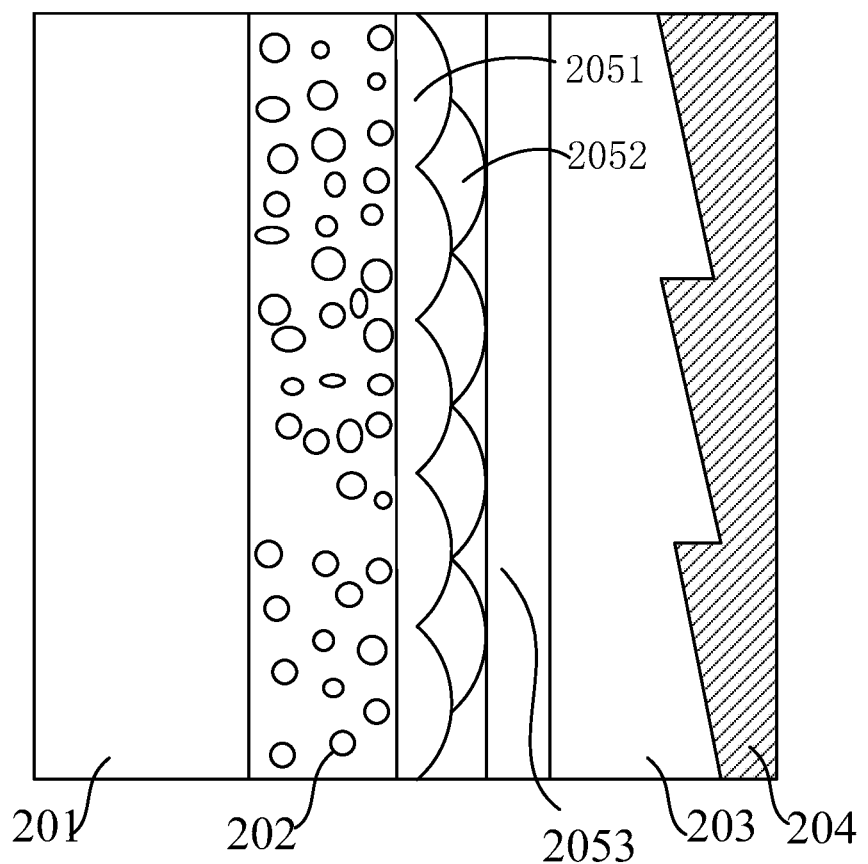
FIG. 10 is a schematic diagram showing a support layer added on the basis of the Fresnel projection screen shown in FIG. 5A.
Figure 11:
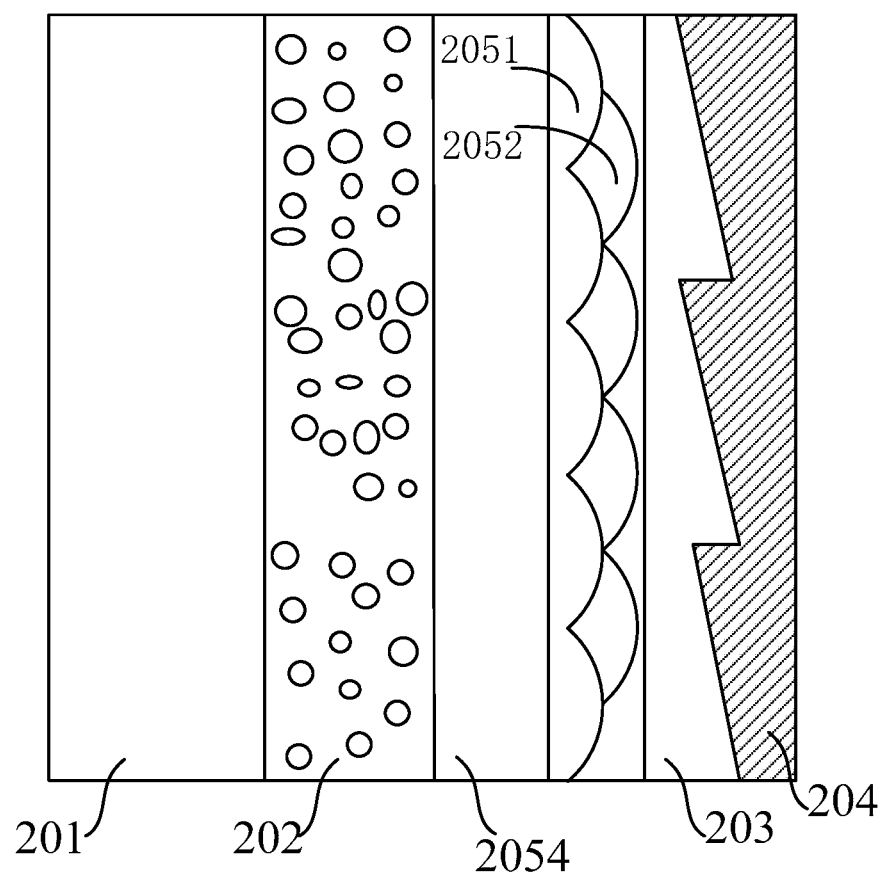
FIG. 11 is a schematic diagram showing another support layer added on the basis of the Fresnel projection screen shown in FIG. 5A.
Figure 12:
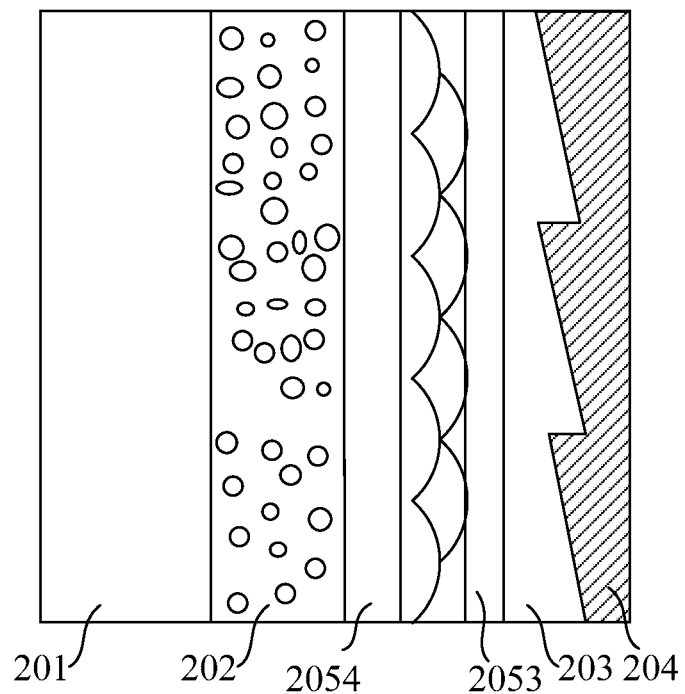
FIG. 12 is a schematic diagram showing support layers added on the basis of the Fresnel projection screen shown in FIG. 5A.

In some embodiments, in order to better fix the micro-structure layer 205, the Fresnel projection screen further includes at least one support layer disposed at at least one side of the transparent layer 100. For example, as shown in FIG. 10, the at least one support layer includes a first support layer 2053 disposed on a side of the micro-structure layer 205 away from the transparent base 201. For another example, as shown in FIG. 11, the at least one support layer includes a second support layer 2054 disposed on a side of the micro-structure layer 205 away from the Fresnel layer 203. For another example, as shown in FIG. 12, the at least one support layer includes the first support layer 2053 disposed on the side of the micro-structure layer 205 away from the transparent base 201, and the second support layer 2054 disposed on the side of the micro-structure layer 205 away from the Fresnel layer 203. That is, the first support layer 2053 and the second support layer 2054 are disposed on both sides of the micro-structure layer 205, respectively. In this way, the first and second protrusions may be better protected.

According to a refraction law of light, in order to reduce a refraction angle of light passing through the micro-structure layer 205 to converge the light, in some examples, a refractive index of the first support layer 2053 is set to be less than a refractive index of the micro-structure layer 205. The refractive index of the micro-structure layer 205 may be set to be within a range from approximately 1.58 to approximately 1.82, such as 1.58, 1.62, 1.7, 1.72, 1.76, 1.78, 1.80, or 1.82. The refractive index of the first support layer 2053 may be set to be within a range from approximately 1.55 to approximately 1.80, such as 1.55, 1.58, 1.62, 1.7, 1.72, 1.76, 1.78, or 1.80. Of course, the refractive index of the first support layer 2053 may also be greater than a refractive index of the micro-structure layer 205.

The first support layer 2053 may be made of styrene-methyl methacrylate copolymer (MS), polyethylene terephthalate (PET) or other resin materials, and the micro-structure layer 205 may be made of a photosensitive adhesive or other materials. It will be noted that the above materials are only described by taking examples, and in practical applications, the materials are not limited thereto, as long as the refractive index of the micro-structure layer 205 is greater than the refractive index of the first support layer 2053.

In a case where the micro-structure layer 205 is made of the photosensitive adhesive, for example, the protrusions with any shape described above may be formed in the mold by using an ultraviolet (UV) curing adhesive; then, the protrusions may be peeled off the mold after UV curing to be transferred to specified positions in the Fresnel projection screen. In addition, the protrusions may also be formed by using a transparent resin material of a traditional lens according to a set shape and a set size, and then are transferred to the projection screen.

The support layers located on both sides of the micro-structure layer 205 may be formed by means of injection molding, die casting, spray coating, evaporation or printing.

The first support layer 2053 and the second support layer 2054 may be made of a same material, and are in direct contact with surfaces of the transparent layer 100 respectively. In order to facilitate to form the transparent layer 100, two opposite surfaces of the second support layer 2054 may be set to have a planar shape. After the micro-structure layer 205 is formed on a surface of the second support layer 2054 facing away from the diffusion layer 202, the first support layer 2053 may be formed by using the coating process, and a surface of the first support layer 2053 facing away from the micro-structure layer 205 is made to have a planar shape, so as to facilitate attachment to the Fresnel layer 203.

In a case where the first support layer 2053 and the second support layer 2054 are made of the same material, for example, the first support layer 2053 and the second support layer 2054 may be both made of MS, PET or other resin materials.

In some embodiments, in the Fresnel projection screen, the transparent base 201 may also be replaced with the protective layer or a color filter layer, as long as it has a high transmittance to light.

Figure 13:
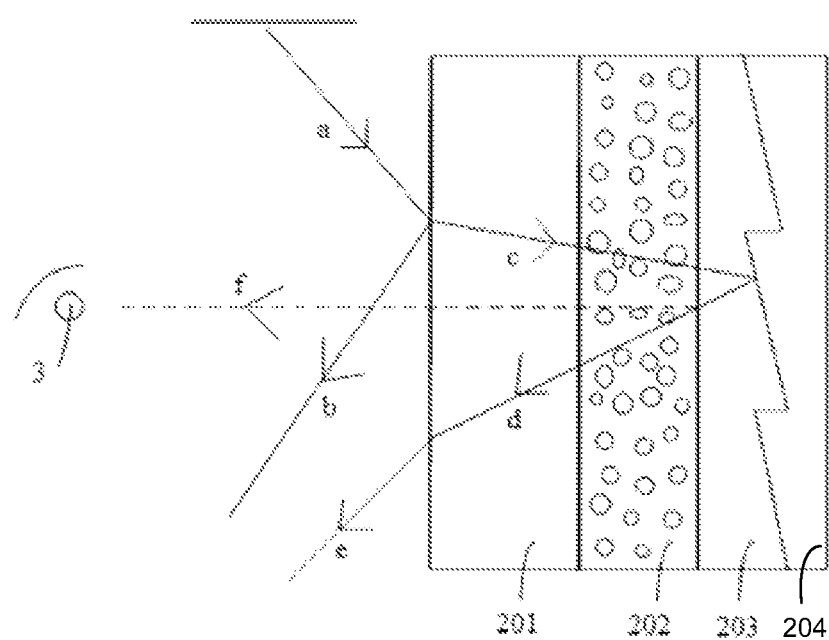
FIG. 13 is a diagram showing an anti-ambient light principle of a Fresnel projection screen.

The Fresnel projection screen shown in FIGS. 1 and 2 may resist ambient light. As shown in FIG. 13, an ambient light resistance principle of the Fresnel projection screen is that the ambient light (i.e., light beams a) is incident onto the surface of the projection screen, a portion of the ambient light (i.e., light beams b) is reflected by the Fresnel projection screen, and another portion of the light (i.e., light beams c) enters the screen, and then is reflected by the reflective surface of the Fresnel layer 203 to form light beams d, and finally exits from the screen in a form of light beams e. Since the light beams b and the light beams e fail to enter human eyes 3, a viewing effect of the viewer is not affected, that is, the screen has a resistance to the ambient light.

However, when light beams d pass through the diffusion layer 202, a small portion of the light (i.e., light beams f) may directly enter the human eyes 3, which may affect the viewing effect of the viewer (intuitively, reducing a contrast of the image on the screen and whitening the image). That is, the resistance of the screen to the ambient light may be insufficient.

As shown in FIGS. 14 to 17, the Fresnel projection screen in some embodiments further includes at least one spectrally selective layer 207.

Figure 17:
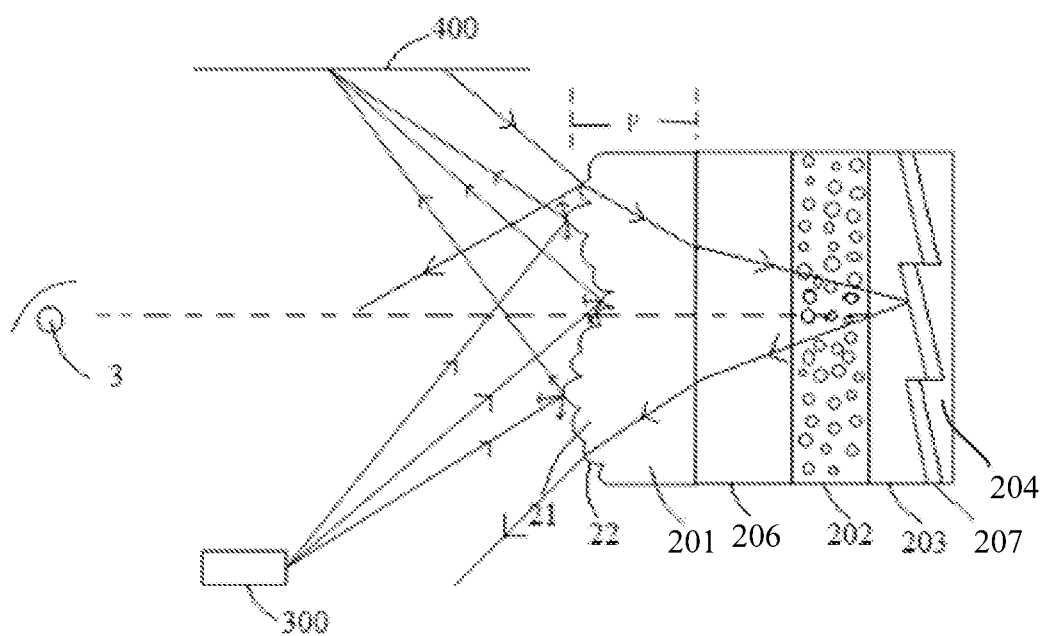
FIG. 17 is a schematic diagram of yet another Fresnel projection screen, in accordance with some embodiments.

FIG. 17 shows a spectrally selective layer 207 for a Fresnel projection screen, according to some embodiments. As shown in FIG. 17, the spectrally selective layer 207 is located on a side of the Fresnel layer 203 away from the diffusion layer 202. For example, the spectrally selective layer 207 is disposed between the Fresnel layer 203 and the reflective layer 204.

In some examples, the spectrally selective layer 207 is configured to reflect red light, green light and blue light that are in three wavelength ranges respectively, and to absorb at least a portion of unreflected light. In some other examples, the spectrally selective layer 207 is configured to transmit the red light, the green light and the blue light that are in the three wavelength ranges respectively, and to absorb or reflect light except for the red light, the green light and the blue light that are respectively in the three wavelength ranges.

In this way, the spectrally selective layer 207 reflects the red light, the green light and the blue light that are in the three wavelength ranges in ambient light reaching the spectrally selective layer 207, and absorb at least a portion of the unreflected light. As a result, an amount of the ambient light exiting from the diffusion layer 202 is less than the amount of light beams d, and thus an amount of the light entering the human eyes 3 is also less than the amount of light beams f, thereby reducing an influence on the viewing effect of the viewer, i.e., improving the resistance of the Fresnel projection screen to the ambient light.

Each region of the spectrally selective layer 207 corresponding to a corresponding pixel in the Fresnel projection screen includes a red filter sub-region R, a green filter sub-region G and a blue filter sub-region B. The region of the spectrally selective layer 207 corresponding to a corresponding pixel in the Fresnel projection screen may transmit the red light, the green light and the blue light that is in the respective wavelength ranges, and absorb light in other wavelength ranges.

For example, there are the following several implementations for the arrangement of the red filter sub-region R, the green filter sub-region G, and the blue filter sub-region B, as shown in FIGS. 19 to 23. Of course, the arrangement of the red filter sub-region R, the green filter sub-region G, and the blue filter sub-region B is not limited thereto, and can be designed according to actual needs.

Figure 14:
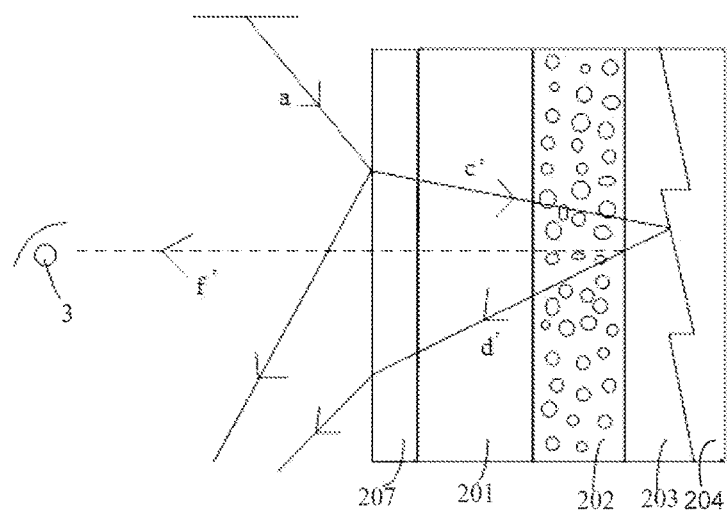
FIG. 14 is a schematic diagram of a spectrally selective layer of a Fresnel projection screen, in accordance with some embodiments.
Figure 15:
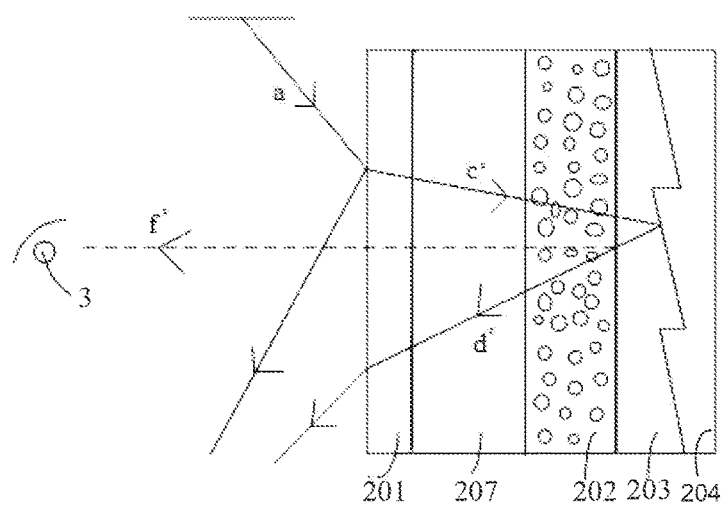
FIG. 15 is a schematic diagram of a spectrally selective layer of another Fresnel projection screen, in accordance with some embodiments.
Figure 16:
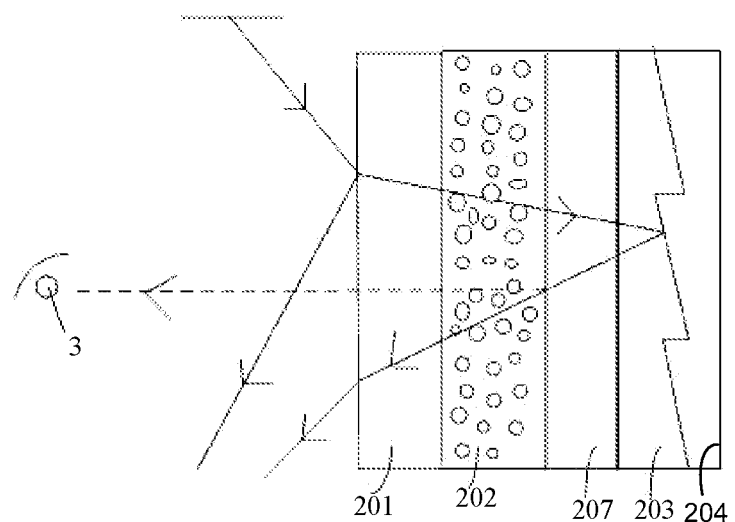
FIG. 16 is a schematic diagram of a spectrally selective layer of yet another Fresnel projection screen, in accordance with some embodiments.

In a case where the at least one spectrally selective layer 207 is configured to transmit the red light, the green light and the blue light that are in the three wavelength ranges respectively, and to absorb or reflect the light except for the red light, the green light and the blue light that are in the three wavelength ranges, the at least one spectrally selective layer 207 may be disposed at at least one of the following positions: a position on the light incident side of the transparent base 201 as shown in FIG. 14, a position between the transparent base 201 and the diffusion layer 202 as shown in FIG. 15, or a position between the diffusion layer 202 and the Fresnel layer 203 as shown in FIG. 16.

In a case where the at least one spectrally selective layer 207 is configured to transmit the red light, the green light and the blue light that are in the three wavelength ranges respectively, and to absorb the light except for the red light, the green light and the blue light that are in the three wavelength ranges, the at least one spectrally selective layer 207 may be disposed between the Fresnel layer 203 and the reflective layer 204 as shown in FIG. 17.

In some embodiments, as shown in FIGS. 14 and 15, the spectrally selective layer 207 is disposed at a light incident side of the diffusion layer 202. In the ambient light reaching the spectrally selective layer 207, only the red light, the green light and the blue light in three wavelength ranges respectively may pass through the spectrally selective layer 207 and the diffusion layer 202 (light beams c'), and then form light beams d' after being reflected by the Fresnel layer 203. The light in other wavelength ranges cannot pass through the spectrally selective layer 207 and the diffusion layer 202. Therefore, the amount of light beams d' is less than the amount of light beams d, and further the number of light beams f' directly entering the human eyes 3 after light beams d' pass through the diffusion layer 202 is also less than the amount of light beams f, thereby reducing the influence on the viewing effect of the human eyes 3, i.e., improving the resistance of the Fresnel projection screen to the ambient light.

As shown in FIG. 16, the spectrally selective layer 207 is disposed between the diffusion layer 202 and the Fresnel layer 203 of the Fresnel projection screen. In the ambient light reaching the spectrally selective layer 207, the red light, the green light and the blue light that are in the three wavelength ranges pass through the spectrally selective layer 207 and then are reflected by the Fresnel layer 203. At least a portion of the light in other wavelength ranges is absorbed by the spectrally selective layer 207. Therefore, the amount of the ambient light exiting from the diffusion layer 202 is less than the amount of light beams d, and further the amount of the light entering the human eyes 3 is also less than the amount of light beams f, thereby reducing the influence on the viewing effect of the human eyes 3, i.e., improving the resistance of the Fresnel projection screen to the ambient light.

In some embodiments, red light, green light and blue light that are respectively within a wavelength range from approximately 610 nm to approximately 650 nm, within a wavelength range from approximately 500 nm to approximately 540 nm, and within a wavelength range from approximately 430 nm to approximately 460 nm are reflected or transmitted, since the red light, the green light and the blue light that are in the three wavelength ranges have pure colors. Therefore, the spectrally selective layer 207 may make a display effect of the image on the Fresnel projection screen good.

Figures 18, 19, 20, 21:
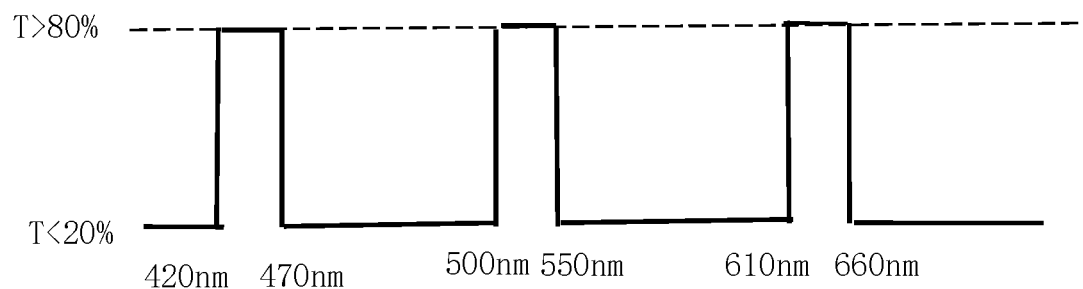
FIG. 18 is a graph showing a transmittance of a spectrally selective layer of a Fresnel projection screen, in accordance with some embodiments.
FIG. 19 shows an arrangement of RGBW.
FIG. 20 shows a mosaic arrangement of RGB.
FIG. 21 shows a triangular arrangement of RGB.

In some embodiments, wavelengths of the red light, the green light, and the blue light that are in the three wavelength ranges are respectively within a range from approximately 610 nm to approximately 660 nm, within a range from approximately 500 nm to approximately 550 nm, and within a range from approximately 420 nm to approximately 470 nm. As such, the spectrally selective layer 207 may make the Fresnel projection screen suitable for a laser projector capable of emitting light in the above three wavelength ranges. FIG. 18 shows a curve of a transmittance of the spectrally selective layer 207, in which T is the transmittance.

In some embodiments, at least a portion of the red light, the green light, and the blue light that are in the three wavelength ranges may be selectively reflected or transmitted instead of reflecting or transmitting all the red light, the green light and the blue light that are in the three wavelength ranges. For example, red light within the wavelength range from 610 nm to 650 nm is reflected or transmitted, and at least a portion of red light within a remaining wavelength range is absorbed. Green light within the wavelength range from 500 nm to 540 nm is reflected or transmitted, and at least a portion of green light within a remaining wavelength range is absorbed. Blue light within the wavelength range from 430 nm to 460 nm is reflected or transmitted, and at least a portion of blue light within a remaining wavelength range is absorbed.

In some embodiments, red light within a wavelength range from 630 nm to 650 nm is reflected or transmitted, and at least a portion of red light within a remaining wavelength range is absorbed. Green light within a wavelength range from 510 nm to 520 nm is reflected or transmitted, and at least a portion of green light within a remaining wavelength range is absorbed. Blue light within a wavelength range from 440 nm to 450 nm is reflected or transmitted, and at least a portion of blue light within a remaining wavelength range is absorbed. In the red light, the green light and the blue light that are in the three wavelength ranges, the red light, the green light and the blue light that are respectively within the wavelength range from 630 nm to 640 nm, within the wavelength range from 510 nm to 520 nm, and within the wavelength range from 440 nm to 450 nm are selected to be reflected or transmitted. In this way, the spectrally selective layer 207 may make the Fresnel projection screen suitable for the laser projector 300 capable of emitting light in the above three wavelength ranges.

A thickness of the spectrally selective layer 207 of the Fresnel projection screen is, for example, within a range from approximately 10 μm to approximately 200 μm, such as 10 μm, 50 μm, 100 μm, 150 μm or 200 μm. As such, on the one hand, the Fresnel projection screen may be prevented from being too thick due to a too thick spectrally selective layer, and on the other hand, the resistance of the Fresnel projection screen to the ambient light may be prevented from being reduced due to a too thin spectrally selective layer.

The spectrally selective layer 207 is made of, for example, silicon dioxide, lithium fluoride, magnesium fluoride, or of calcium fluoride. In this way, stability of the wavelength selection function of the spectrally selective layer 207 may be improved.

The spectrally selective layer 207 is formed through, for example, a vacuum evaporation process. In this way, the forming method may be simpler and easier to implement.

Figure 24:
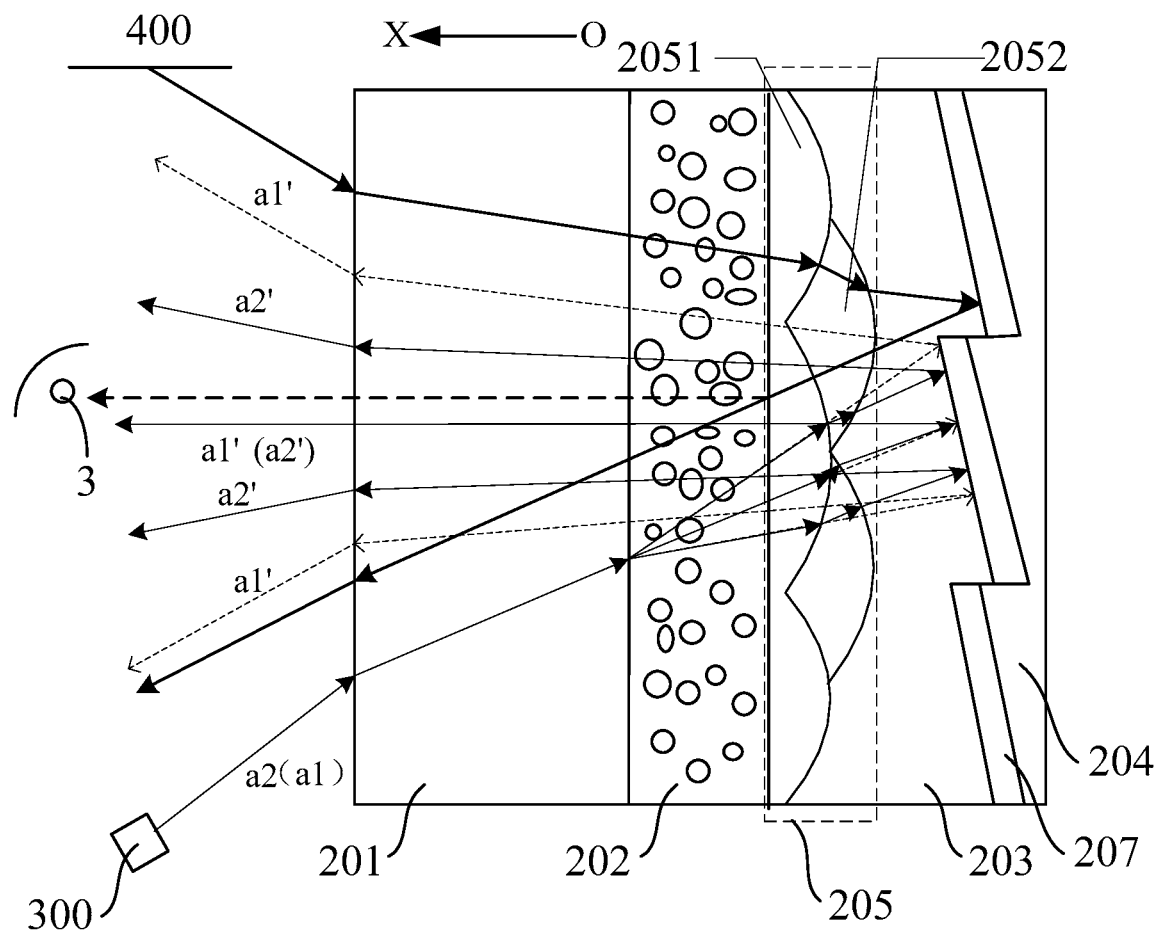
FIG. 24 is a schematic diagram of yet another Fresnel projection screen, in accordance with some embodiments.

FIG. 24 shows a spectrally selective layer 207 for a Fresnel projection screen, according to some embodiments of the present disclosure. As shown in FIG. 24, the spectrally selective layer 207 is located on the reflective surface of the Fresnel layer 203. The spectrally selective layer 207 is configured to reflect the red light, the green light and the blue light that are in the three wavelength ranges respectively, and to absorb at least a portion of the unreflected light.

Figure 25:
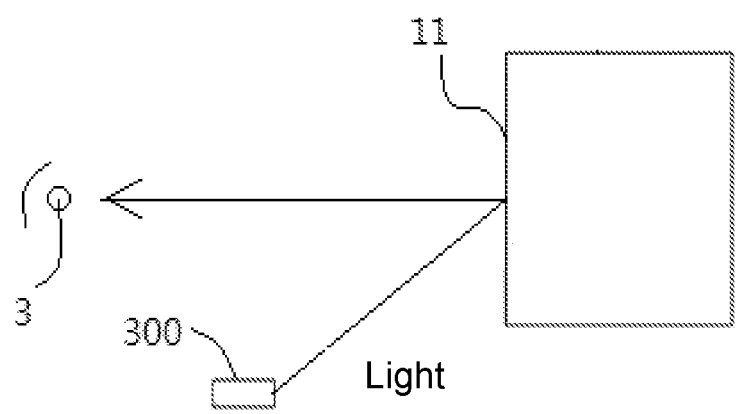
FIG. 25 is a schematic diagram of a projection system, in accordance with some embodiments.

Some embodiments of the present disclosure provide a projection system. As shown in FIG. 25, the projection system includes a projector 300 configured to project light onto a projection surface 11, and any Fresnel projection screen described above. The Fresnel projection screen has the projection surface 11 and is configured to receive the light projected by the projector 300 and display a corresponding image.

The present disclosure may also provide additional embodiments, and one or more of components, functions, or structures in the additional embodiments may be replaced or supplemented by one or more of the components, the functions, or the structures in any Fresnel projection screen described above.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A Fresnel projection screen, comprising:
a Fresnel layer;
a first micro-structure layer disposed at a light incident side of the Fresnel layer, the first micro-structure layer including a plurality of first micro-structures that are configured to diffusely reflect a portion of light incident thereon and refract another portion of the light;
a second micro-structure layer disposed on a surface of the first micro-structure layer, the second micro-structure layer including a plurality of second micro-structures that are configured to diffusely reflect a portion of light incident thereon and refract another portion of the light; and
a reflective layer disposed on a side of the Fresnel layer away from the first micro-structure layer;
wherein the plurality of first micro-structures and the plurality of second micro-structures are projections; and
a curvature radius of each first micro-structure is within a range from 50 μm to 500 μm, and a curvature radius of each second micro-structure is within a range from 10 μm to 100 μm.

2. The Fresnel projection screen according to claim 1, wherein widths, lengths, thicknesses and shapes of the plurality of first micro-structures are random, or the plurality of first micro-structures have a same shape, a same width, a same length and a same thickness; and
widths, lengths, thicknesses and shapes of the plurality of second micro-structures are random, or the plurality of second micro-structures have a same shape, a same width, a same length and a same thickness.

3. The Fresnel projection screen according to claim 2, wherein each first micro-structure and each second micro-structure satisfy at least one of the following:
a width of each first micro-structure is greater than a width of each second micro-structure;
a length of each first micro-structure is greater than a length of each second micro-structure; or
a thickness of each first micro-structure is greater than a thickness of each second micro-structure.

4. The Fresnel projection screen according to claim 1, wherein a refractive index of each of the first micro-structure layer and the second micro-structure layer is within a range from 1.3 to 1.8.

5. The Fresnel projection screen according to claim 1, wherein the second micro-structure layer is an outermost layer of the Fresnel projection screen, and the plurality of second micro-structures cover at least part of the first micro-structure layer.

6. The Fresnel projection screen according to claim 1, wherein the second micro-structure layer is disposed between the first micro-structure layer and the Fresnel layer.

7. The Fresnel projection screen according to claim 6, wherein the plurality of first micro-structures and the plurality of second micro-structures are staggered in a vertical direction of the Fresnel projection screen.

8. The Fresnel projection screen according to claim 6, wherein the Fresnel projection screen further comprises a first support layer disposed on a surface of the second micro-structure layer proximate to the Fresnel layer, and
the first support layer is configured to support the second micro-structure layer and the first micro-structure layer.

9. The Fresnel projection screen according to claim 8, further comprising a second support layer disposed on a surface of the first micro-structure layer away from the Fresnel layer,
wherein the second support layer is configured to support the second micro-structure layer and the first micro-structure layer.

10. The Fresnel projection screen according to claim 9, further comprising a diffusion layer disposed on a side of the first micro-structure layer away from the Fresnel layer,
wherein the diffusion layer is configured to homogenize the light.

11. The Fresnel projection screen according to claim 1, wherein the plurality of first micro-structures and the plurality of second micro-structures are projections extending along a horizontal direction of the Fresnel projection screen; and
along a direction pointing to the Fresnel layer from the micro-structure layer or along a direction pointing to the micro-structure layer from the Fresnel layer, a dimension, in the vertical direction of the Fresnel projection screen, of a cross section of each of the first micro-structures and the second micro-structures decreases.

12. The Fresnel projection screen according to claim 1, further comprising a spectrally selective layer located at a light incident side of the reflective layer,
wherein
the spectrally selective layer is configured to reflect light with preset wavelength ranges, and to absorb at least a portion of remaining light, or
the spectrally selective layer is configured to transmit the light with the preset wavelength ranges, and to absorb or reflect at least a portion of the remaining light.

13. A projection system, comprising:
a projector configured to project light onto the Fresnel projection screen according to claim 1; and
the Fresnel projection screen,
wherein the Fresnel projection screen is configured to receive the light projected by the projector and to display a corresponding image.

14. A Fresnel projection screen, comprising a transparent layer, a color layer, a diffusion layer and a Fresnel layer arranged in sequence along a light incident direction;
wherein the transparent layer includes:
a transparent base; and
a micro-structure layer disposed on a light incident surface of the transparent base and configured to diffusely reflect a portion of light incident thereon and refract another portion of the light; wherein
the micro-structure layer includes a plurality of first micro-structures and a plurality of second micro-structures disposed on a surface of the plurality of first micro-structures;
a dimension of each first micro-structure is greater than a dimension of each second micro-structure, and the dimension includes at least one of a width, length or thickness of a micro-structure;
the plurality of first micro-structures and the plurality of second micro-structures are projections; and
a curvature radius of each first micro-structure is within a range from 50 μm to 500 μm and a curvature radius of each second micro-structure is within a range from 10 μm to 100 μm.

15. The Fresnel projection screen according to claim 14, wherein a refractive index of the transparent layer is within a range from 1.3 to 1.8.

16. The Fresnel projection screen according to claim 14, wherein the material of the transparent layer includes at least one of polycarbonate (PC), polyethylene terephthalate (PET), styrene-co-methyl methacrylate (MS), or polymethyl methacrylate (PMMA).

17. The Fresnel projection screen according to claim 14, wherein the transparent layer is bonded to the color layer.

18. The Fresnel projection screen according to claim 14, further comprising a protective layer disposed at a light incident side of the color layer; wherein
the transparent layer is bonded to the protective layer.

19. A Fresnel projection screen, comprising:
a Fresnel layer;
a first micro-structure layer disposed at a light incident side of the Fresnel layer, the first micro-structure layer including a plurality of first micro-structures that are configured to diffusely reflect a portion of light incident thereon and refract another portion of the light;
a second micro-structure layer disposed on a surface of the first micro-structure layer, the second micro-structure layer including a plurality of second micro-structures that are configured to diffusely reflect a portion of light incident thereon and refract another portion of the light; and
a reflective layer disposed on a side of the Fresnel layer away from the first micro-structure layer;
wherein the second micro-structure layer is disposed between the first micro-structure layer and the Fresnel layer.

20. The Fresnel projection screen according to claim 19, wherein the plurality of first micro-structures and the plurality of second micro-structures are staggered in a vertical direction of the Fresnel projection screen.

* * * * *